US011531995B2

(12) United States Patent
Johnson et al.

(10) Patent No.: US 11,531,995 B2
(45) Date of Patent: *Dec. 20, 2022

(54) CONSENT MANAGEMENT SYSTEM WITH CONSENT REQUEST PROCESS

(71) Applicant: Universal Electronics Inc., Scottsdale, AZ (US)

(72) Inventors: Brian Paul Johnson, Eden Prairie, MN (US); Peter William Ellison, Plymouth, MN (US); Matthew Jorgensen, Eden Prairie, MN (US); George Earl Harvey, Plymouth, MN (US); Kurt Roman Thielen, Maple Grove, MN (US)

(73) Assignee: Universal Electronics Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/379,700

(22) Filed: Jul. 19, 2021

(65) Prior Publication Data

US 2021/0342860 A1 Nov. 4, 2021

Related U.S. Application Data

(63) Continuation of application No. 17/075,901, filed on Oct. 21, 2020, now Pat. No. 11,100,516.

(Continued)

(51) Int. Cl.
*G06Q 30/00* (2012.01)
*G06F 16/955* (2019.01)
(Continued)

(52) U.S. Cl.
CPC ............ *G06Q 30/018* (2013.01); *G06F 8/65* (2013.01); *G06F 16/22* (2019.01);
(Continued)

(58) Field of Classification Search
CPC ............ G06Q 30/018; G06Q 30/0201; G06Q 30/0277; G06Q 50/18; G06F 8/65;
(Continued)

(56) References Cited

U.S. PATENT DOCUMENTS 7,610,391 B2 10/2009 Dunn
8,959,594 B2 2/2015 Tan
(Continued)

FOREIGN PATENT DOCUMENTS

CN 109165063 A 1/2019
TW 1505122 B 10/2015

OTHER PUBLICATIONS

Office Action and Search Report in Taiwan application TW 109136518, dated Jan. 3, 2022.

(Continued)

*Primary Examiner* — Anthony Bantamoi
(74) *Attorney, Agent, or Firm* — Greenberg Traurig, LLP

(57) ABSTRACT

A method may include receiving a consent-processing request at a consent management platform from a content-presentation device, and using an identifier string in the request to establish a secure interactive session configured for user selection of consent options associated with a particular consent package of the platform, where the package may include identifiers of consent features of a media distribution system that require user consent in order to be activated for the device. The platform may then receive, via the interactive session, user consent data including a respective consent choice for each of one or more consent options, where each respective consent choice indicates acceptance or rejection of consent to activating an associated consent feature identified with the particular consent package. The received respective consent choices may be stored in a database of the consent management platform. Correspond- (Continued)

ing data may be stored in a whitelist on the content-presentation device.

20 Claims, 16 Drawing Sheets

Related U.S. Application Data

(60) Provisional application No. 62/924,102, filed on Oct. 21, 2019.

(51) Int. Cl.
| | |
|---|---|
| *G06F 16/9538* | (2019.01) |
| *G06F 16/22* | (2019.01) |
| *G06F 8/65* | (2018.01) |
| *G06Q 30/02* | (2012.01) |
| *G06Q 50/18* | (2012.01) |
| *H04L 9/32* | (2006.01) |
| *H04L 9/40* | (2022.01) |
| *H04N 7/173* | (2011.01) |
| *H04N 21/258* | (2011.01) |
| *H04N 21/45* | (2011.01) |
| *H04N 21/81* | (2011.01) |
| *H04N 21/441* | (2011.01) |

(52) U.S. Cl.
CPC ...... *G06F 16/9538* (2019.01); *G06F 16/9566* (2019.01); *G06Q 30/0201* (2013.01); *G06Q 30/0277* (2013.01); *G06Q 50/18* (2013.01); *H04L 9/3213* (2013.01); *H04L 9/3234* (2013.01); *H04L 9/3247* (2013.01); *H04L 9/3268* (2013.01); *H04L 63/0227* (2013.01); *H04L 63/0823* (2013.01); *H04L 63/0876* (2013.01); *H04N 7/17318* (2013.01); *H04N 21/25891* (2013.01); *H04N 21/441* (2013.01); *H04N 21/4532* (2013.01); *H04N 21/812* (2013.01)

(58) Field of Classification Search
CPC ................. G06F 16/22; G06F 16/9538; G06F 16/9566; H04L 9/3213; H04L 9/3234; H04L 9/3247; H04L 9/3268; H04L 63/0227; H04L 63/0823; H04L 63/0876; H04N 7/17318; H04N 21/25891; H04N 21/441; H04N 21/4532; H04N 21/812
See application file for complete search history.

(56) References Cited

U.S. PATENT DOCUMENTS

| | | |
|---|---|---|
| 10,885,218 B2 | 1/2021 | Li et al. |
| 2010/0306834 A1 | 12/2010 | Granison |
| 2017/0289247 A1 | 10/2017 | Hoarau et al. |
| 2018/0247385 A1 | 8/2018 | Whilfield et al. |
| 2018/0367531 A1 | 12/2018 | von Krogh |
| 2019/0005210 A1 | 1/2019 | Wiederspohn et al. |
| 2019/0180051 A1 | 6/2019 | Barday et al. |
| 2019/0188411 A1 | 6/2019 | Kroutik |

OTHER PUBLICATIONS

Search Report and Written Opinion for PCT/US2020/056488 dated Feb. 2, 2021.
Search Report and Written Opinion for PCT/US2020/056445 dated Feb. 2, 2021.
Search Report and Written Opinion for PCT/US2020/056455 dated Jan. 29, 2021.
Search Report and Written Opinion for PCT/US2020/056458 dated Jan. 29, 2021.
Search Report and Written Opinion for PCT/US2020/056450 dated Jan. 26, 2021.

Privacy Management

Consent Package

| Package Information | Whitelist Items | Package Contents |

Select Whitelist Item for this consent package

- ☐ DAIOLD
- ☑ Dynamic Ad Insertion Client
- ☑ ACR for Audience Measurement
- ☐ ACROLD ( Back )  ( Next )  |  ( Save )  |  ( Done )

Privacy Management

| Consent Campaign | Campaign Info ≫ Jurisdiction ≫ Consent Package ≫ Complaint Packages |

Consent Package

Consent Package selected for this campaign

| Name | Description | CreatedDate | LastModifiedDate |
|---|---|---|---|
| BetaFieldPackage-v3 | PrivacyPolicy. Defects arou... | 07/10/2020 | |

To change the Consent Package for this campaign, select the option below

[ Edit ]

( Back ) ( Next ) | ( Save ) | ( Done )

Figure 7D

CONSENT MANAGEMENT SYSTEM WITH CONSENT REQUEST PROCESS

CROSS-REFERENCE TO RELATED APPLICATIONS

This application is a continuation of and claims priority to U.S. patent application Ser. No. 17/075,901, filed Oct. 21, 2020, which claims priority under 35 U.S.C. § 119(e) to U.S. Provisional Patent Application Ser. No. 62/924,102, filed on Oct. 21, 2019. Both of the aforementioned applications are incorporated herein by reference in their entireties.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, a method may include: at a consent management platform disposed in a computing cloud, receiving from a remotely-located content-presentation device a consent-processing request comprising an identifier string specific and unique to the content-presentation device; responsive to the consent processing request, using the identifier string to establish a secure interactive communication session with the content-presentation device configured for user selection of one or more consent options associated with a particular consent package of the consent management platform, the particular consent package comprising identifiers of consent features of a media distribution system that require prior end-user consent in order to be activated for the content-presentation device, wherein the particular consent package is one of one or more consent packages for which the content-presentation device has been designated as a target device by the consent management platform; at the consent management platform, receiving from the content-presentation device, via the secure interactive communication session, user consent data input including a respective consent choice for each of the one or more consent options, each respective consent choice indicating one of either acceptance or rejection of consent to activating for the content-presentation device an associated consent feature identified with the particular consent package; and at the consent management platform, storing the respective consent choices of the received consent data in a database of the consent management platform, wherein information corresponding to the respective consent choices stored in the database of the consent management platform is recorded in a device-based device record that is stored on the content-presentation device, and that comprises a device-based activation whitelist for recording an identifier of each consent feature associated with a respective consent choice indicating acceptance of consent.

In another aspect, a consent management platform disposed in a computing cloud may include: one or more processors; and a computer-readable storage medium having stored thereon program instructions that, upon execution by the one or processors, cause the consent management platform to carry out operations including: receiving from a remotely-located content-presentation device a consent-processing request comprising an identifier string specific and unique to the content-presentation device; responsive to the consent processing request, using the identifier string to establish a secure interactive communication session with the content-presentation device configured for user selection of one or more consent options associated with a particular consent package of the consent management platform, the particular consent package comprising identifiers of consent features of a media distribution system that require prior end-user consent in order to be activated for the content-presentation device, wherein the particular consent package is one of one or more consent packages for which the content-presentation device has been designated as a target device by the consent management platform; receiving from the content-presentation device, via the secure interactive communication session, user consent data input including a respective consent choice for each of the one or more consent options, each respective consent choice indicating one of either acceptance or rejection of consent to activating for the content-presentation device an associated consent feature identified with the particular consent package; and storing the respective consent choices of the received consent data in a database of the consent management platform, wherein information corresponding to the respective consent choices stored in the database of the consent management platform is recorded in a device-based device record that is stored on the content-presentation device, and that comprises a device-based activation whitelist for recording an identifier of each consent feature associated with a respective consent choice indicating acceptance of consent.

In another aspect, non-transitory computer-readable storage medium may have stored thereon program instructions that, upon execution by one or more processors of a consent management platform, cause the consent management platform to carry out operations including: receiving from a remotely-located content-presentation device a consent-processing request comprising an identifier string specific and unique to the content-presentation device; responsive to the consent processing request, using the identifier string to establish a secure interactive communication session with the content-presentation device configured for user selection of one or more consent options associated with a particular consent package of the consent management platform, the particular consent package comprising identifiers of consent features of a media distribution system that require prior end-user consent in order to be activated for the content-presentation device, wherein the particular consent package is one of one or more consent packages for which the content-presentation device has been designated as a target device by the consent management platform; receiving from the content-presentation device, via the secure interactive communication session, user consent data input including a respective consent choice for each of the one or more consent options, each respective consent choice indicating one of either acceptance or rejection of consent to activating for the content-presentation device an associated consent feature identified with the particular consent package; and storing the respective consent choices of the received consent data in a database of the consent management platform, wherein information corresponding to the respective consent choices stored in the database of the consent management platform is recorded in a device-based device record that is stored on the content-presentation device, and that comprises a device-based activation whitelist for recording an identifier of each consent feature associated with a respective consent choice indicating acceptance of consent.

BRIEF DESCRIPTION OF THE DRAWINGS

FIGS. 7A, 7B, 7C, and 7D depict example webpage displays of a server of a consent management system, in accordance with example embodiments.

DETAILED DESCRIPTION

I. Overview

Figure 1:
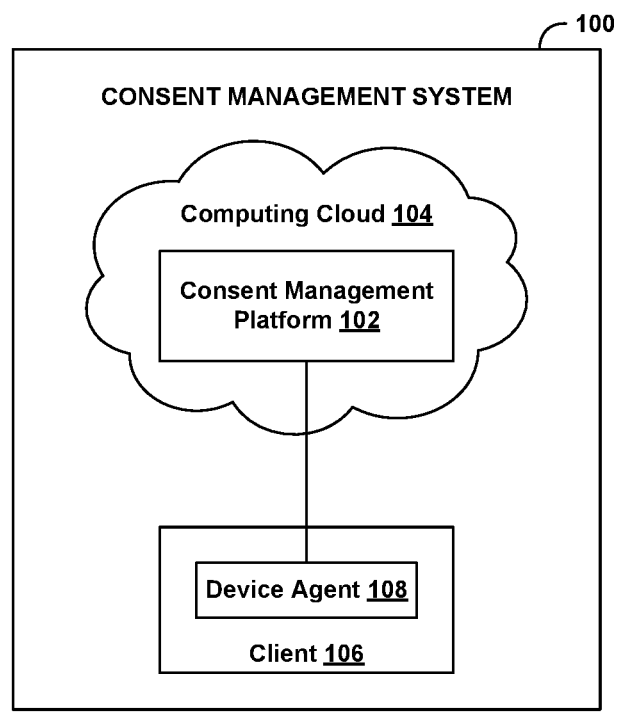
FIG. 1 is a simplified block diagram of an example consent management system in which various described principles can be implemented.

To deliver and present content to end-users, a content provider can transmit the content to one or more content-distribution systems, each of which can in turn transmit the content to one or more respective content-presentation devices, such as television sets and/or set-top boxes, to be output for presentation to respective end-users. Such a hierarchical arrangement can facilitate convenient, widespread distribution of content.

By way of example, in order for a video content provider to deliver video content to end-users throughout the United States, the video content provider can transmit the video content by satellite or another medium to content-distribution systems that serve respective designated market areas (DMAs) within the United States. Each such content-distribution system can therefore receive the national satellite feed carrying the video content and can transmit the video content to television sets and/or set-top boxes in the content-distribution system's DMA, such that the video content can be output for presentation to respective end-users in that DMA. In practice, these content-distribution systems and their means of transmission to content-presentation devices can take various forms. For instance, a content-distribution system can be associated with a cable-television provider and can transmit video content to content-presentation devices of end-users who are cable-television subscribers through hybrid fiber/coaxial cable connections.

As such, in various scenarios, a content-distribution system can transmit content to a content-presentation device, which can receive and output the content for presentation to an end-user. In some situations, even though the content-presentation device receives content from the content-distribution system, it can be desirable for the content-presentation device to perform a content-modification operation so that the content-presentation device can output for presentation alternative content instead of at least a portion of that received content.

For example, in the case where the content-presentation device receives a linear sequence of content segments that includes a given advertisement segment positioned somewhere within the sequence, it can be desirable for the content-presentation device to replace the given advertisement segment with a different advertisement segment that is perhaps more targeted to the end-user (e.g., more targeted to the end-user's interests, demographics, etc.). As another example, it can be desirable for the content-presentation device to overlay on the given advertisement segment, overlay content that enhances the given advertisement segment in a way that is again perhaps more targeted to the end-user. Other forms of content modification are possible as well.

Content modification is one example of media operations and/or services and/or media-related services and/or operations that a content-presentation device or client device can perform to enhance, extend, or expand more traditionally passive user experiences of program reception. Other examples may include data collection of client viewing history/statistics, and audience response measurement. These are all non-limiting examples of operational features that may, in addition, relate to user preferences and/or user privacy, at least to the extent that users may wish to, and/or may be given legally required, control of if and when to enable and/or activate some or all of the operational features. As such, active performance of such operational features may be subject to, and/or require, prior and/or continuing, user consent. For example, a user may wish to opt out of client viewing history/statistics data collection by their content-presentation device, but may wish to be presented with customized advertising, when available. It may therefore be desirable or necessary to provide users the ability to set or select consent options for operational features that have them, either as a matter of convenience or regulatory compliance, for example.

In addition to setting or selecting options for consent associated with particular operational features, a user may wish to modify previous opt-in/out choices from time to time. There may also be various reasons for a user to be made aware of a need or option to update previous consent choices or selections. Non-limiting examples include the availability of new operational features requiring consent, changes in regulations governing consent for particular operational features, updates in privacy laws, and physical relocation of a content-presentation device from an initial geographic region to a new geographic region for which compliance regulations differ from those of the initial geographic region. It may therefore be necessary or desirable to be able to notify users in such situations, and prompt users to update their consent settings or selections.

In practice, management of consent and privacy relating to the types of enhanced features described above can be complex in terms of the arrays of features involved, the number and variety of consent options associated with the features, factors that determine the consent options, and the number of content-presentation devices that may need to support user selection of consent options. For example, management of consent and privacy may involve identifying operational features subject to consent, determining various legal and jurisdictional compliance aspects of consent, obtaining/tracking/monitoring consent selections/options associated with multitudes of content-presentation devices, and updating consent and privacy options in view of changes to both the universe of operational features subject to consent and the rules that govern/specify consent.

In order to meet these technical and regulatory challenges, the inventors have devised a consent management system and methods of operation thereof that provides efficient and flexible management of consent associated with operational features and/or services that require consent in order to be activated for use on and/or by content-presentation devices. Such operational features and/or services may have some aspects that function on individual content presentation devices and other aspects that function remotely, in servers and/or content provider networks, for example. In accordance with example embodiments, operational aspects of a consent management system may include user device registration, interactive user selection of consent choices, periodic check-in by user devices to ensure and/or update synchronization with the management system, and administrative provisioning/management of the consent management system.

II. Architecture

A. Consent Management System

FIG. 1 is a simplified block diagram of an example consent management system 100, in accordance with example embodiments. The example consent management system 100 includes a consent management platform disposed in a computing cloud 104, and client device 106 that includes a device agent 108. In accordance with example embodiments, the consent management platform 102 may carry out operations relating to administrative provisioning of consent packages and consent campaigns, such as creating and configuring various databases and other information stores for identifying and organizing operational features that are subject to user consent. Other operations of the consent management platform 102 may include storing consent-related information associated with individual client devices, and communicating with client devices in order to register them, obtain user consent information, and synchronize consent information in the client device 106 and the consent management platform 102.

The client device 106 is a user device that may implement operational features and/or services that require prior user consent in order to be activated for execution on the client device. A content-presentation device, such as a smart TV, is an example of a client device. Example operational features and/or services that may be subject to, or require, consent include customized advertisement replacement (or, more generally, content modification), audience response measurement, and user viewing history/statistics. The device agent 108 implements consent-related functions and operations on the client 106, such as communicating with the consent management platform, and providing an interactive user interface, such as a web browser, to obtain user input relating to consent options. The client device may also be referred to herein as a user device or end-user device, since it may be operated by a user.

The computing cloud 104 represents a managed collection of computing hardware and software resources which may be made available via a communications network, such as a public or private internet, to serve as computing and/or networking infrastructure for enterprises and/or organizations. In some deployments, a computing cloud, or just "cloud," may augment or replace computing and/or networking infrastructure for a company or business, for example. The physical implementation of a cloud may include various servers, databases, and file server systems, which may be centrally located and/or distributed. A server may, in turn, include one or more computing devices that include one or more processors, memory, and instructions for carrying out various tasks and operations. Cloud computing resources may be implemented virtually, across multiple subdivisions and/or logical partitions of computing infrastructure, such as processor processing cycles, and delivered to multiple subscribers—e.g., enterprises, organizations, etc.—in a manner that makes the resources appear to each subscriber as dedicated. Some implementations may in fact provide some actual dedicated resources of the cloud to individual subscribers.

A computing cloud may be owned by commercial operator and made available to subscribers for a fee. Examples include Amazon Web Services (AWS™) and Azure™. In other instances, a computing cloud may be owned and operated by the same enterprise or organization that utilizes the resources for supporting its own infrastructure needs. In some arrangements, a cloud may be implemented, at least in part, as a collection of actual servers and storage systems. Other arrangements are possible as well.

As described above, consent management may involve operations carried out on both the consent-management platform 102 and the by the device agent 108 on behalf of the client 106. Operations carried out on the consent-management platform are referred to herein as "cloud-side" operations or "server-side" operations, since they are carried out in the cloud and/or by servers (possibly in the cloud). The term "network-side" operations may also be used. Operations carried out by the device agent 108 are referred to herein as "client-side" operations or "device-side" operations. Since consent management involves both types of operations, and both types of apparatuses, the consent management system 100 is considered to include both the consent management platform 102 and the client device 106.

In accordance with example embodiments, the disposition of the consent management platform 102 in the computing cloud 104 is indicative of implementation of at least some elements of the platform in the cloud. More particularly, the consent management platform 102 may include one or more servers, databases, and file servers implemented in the computing cloud 104. Thus, the servers, databases, and file servers may be implemented virtually and/or physically as shared and/or dedicated resources. Further, some implementations of the server side of a consent management system may be based on one or more servers, data bases, and other computing devices and/or systems, that may not necessarily conform to any particular characterization of a computing cloud, but may nevertheless provide computing infrastructure and resources available via a network to other devices, such as the client device 106. As such example embodiments of a consent management platform, such platform 102, are not necessarily limited to implementation strictly in a computing cloud.

Figure 2:
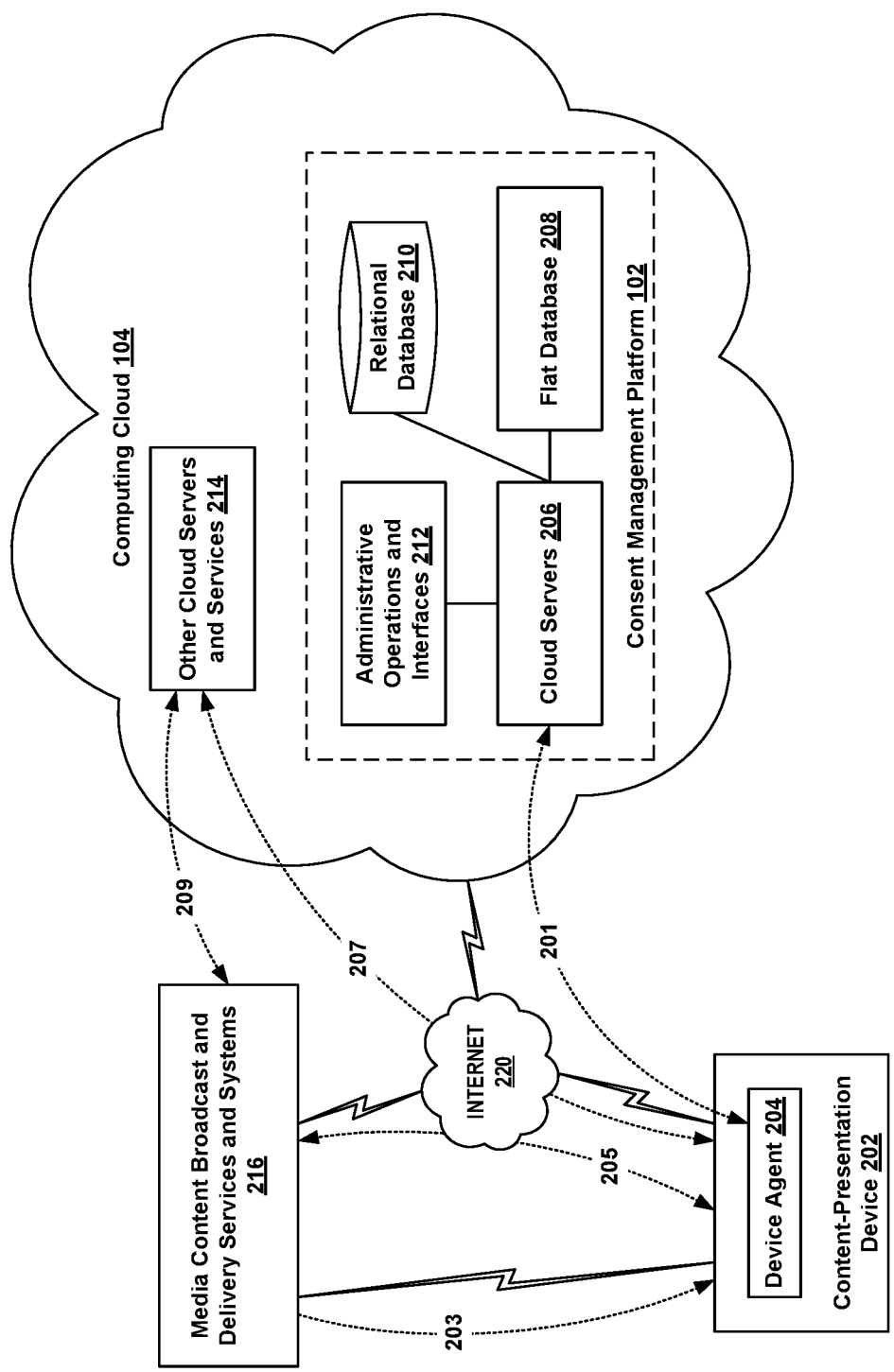
FIG. 2 is a simplified block diagram of an example consent management system shown in a context of an example high-level architecture, in accordance with example embodiments.

FIG. 2 is a simplified block diagram of an example consent management system shown in a context of an example high-level architecture, in accordance with example embodiments. In addition to the consent management platform 102, computing cloud 104, and content-presentation device 202 with device agent 204, FIG. 2 also includes media content broadcast and delivery systems 216 (or just systems 216) and an internet 220 by which, as signified by the lightning bolt lines between the entities and the internet 220, various entities in the figure are communicatively connected. As shown, the consent management platform includes cloud servers 206, a flat database 208, a relational database 210, and administrative operations interfaces 212, some or all of which may be implemented with and/or by cloud resources. The flat database 208 refers to a flat, or horizontal, record structure, in contrast to a table-based structure of a relational database. A flat database may provide significant access speed benefits and advantages for operations such as checking just one or a few data record fields in a database containing a very large number of records. An example of a flat database is a so-called NoSql, or non-SQL database. By way of example, the computing cloud 104 also includes other cloud servers and services 214—also implemented with and/or by cloud resources—which may support other types of services, as described below.

The systems 216 represent media broadcast services that include not only broadcast delivery of content to the content-presentation device 202 via a broadcast connection 203, such as network television broadcasts, for example, but also customized and/or targeted content or other replacement content via a network connection 205. The replacement content could be customized/targeted advertising, for example, that is dynamically inserted by the content-presentation device 202 into the presentation of the broadcast media as it is being displayed or played out in real time. The operations involved in such dynamic content replacement may include communication and coordination between the content-presentation device 202 and the systems 216 via the network connection 205, as well as communication and coordination between the systems 216 and other cloud servers and services 214 via the network connection 209. Dynamic content replacement may also involve communication and coordination between the content-presentation device 202 and the other cloud servers and services 214 via the network connection 207.

While detailed operational description of dynamic content replace or modification is not presented herein, it may be generally understood to include conventional aspects of content broadcast, determination of candidate replacement content based on user identity derived from identity of the content-presentation device, for example, location of candidate content, and various timing operations to ensure that replacement content is inserted into media content playout by the content-presentation device at precisely the right moment. Each of these, and possibly other, device-side operation and/or cloud-side (or server-side) operations may involve coordination and/or cooperation across the network. Dynamic content replacement may involve targeting a specific user, and is therefore an example of a service that may require user consent before it may be activated and carried out. Correspondingly, some or all of the device-side operations and cloud-side operations involved in the service may also require prior user consent. As noted above, audience measurement and viewing history/statistics are other non-limiting examples of services that may require user consent, including consent relating to various device-side operations and cloud-side operations of these services.

As described above, the consent management system 100 includes both the consent-management platform 102 for carrying out cloud-side operations and the content-presentation device 202 for carrying out device-side operations. The communicative connection 201 between the cloud servers 206 of the platform 102 and the device agent 204 of the device 202 support communications between the two sides that are part of various operations of consent management. A detailed discussion of consent management is presented by way of example operational description below.

B. Example Computing System

Figure 3:
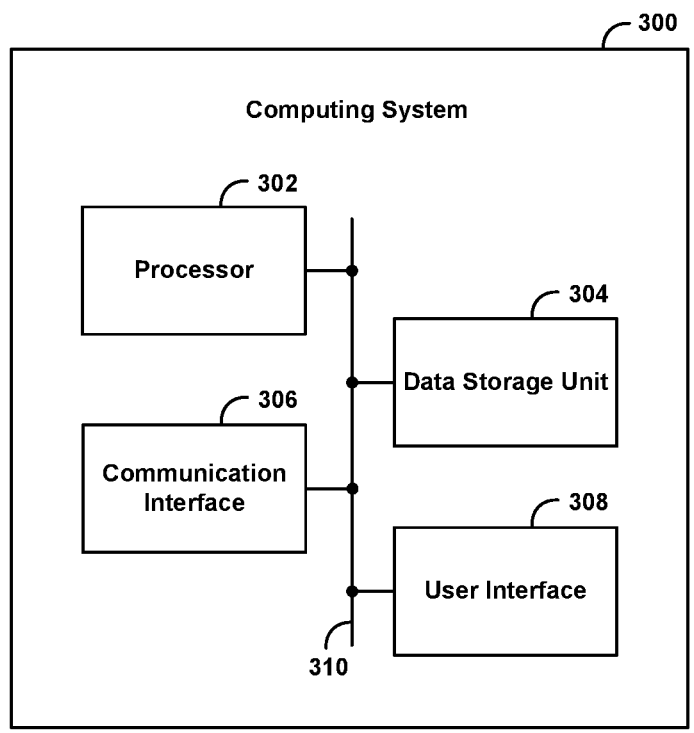
FIG. 3 is a simplified block diagram of an example computing system in which various described principles can be implemented.

FIG. 3 is a simplified block diagram of an example computing or system 300. The computing system 300 can be configured to perform and/or can perform one or more operations, such as the operations described in this disclosure, and represents an example of computing device or system that can be used to partially of fully implement any one or more of the cloud components or devices shown in FIGS. 1 and 2, as well as those referenced elsewhere herein. The computing system 300 can include various components, such as a processor 302, a data-storage unit 304, a communication interface 306, and/or a user interface 308.

The processor 302 can be or include a general-purpose processor (e.g., a microprocessor) and/or a special-purpose processor (e.g., a digital signal processor). The processor 302 can execute program instructions included in the data-storage unit 304 as described below.

The data-storage unit 304 can be or include one or more volatile, non-volatile, removable, and/or non-removable storage components, such as magnetic, optical, and/or flash storage, and/or can be integrated in whole or in part with the processor 302. Further, the data-storage unit 304 can be or include a non-transitory computer-readable storage medium, having stored thereon program instructions (e.g., compiled or non-compiled program logic and/or machine code) that, upon execution by the processor 302, cause the computing system 300 and/or another computing system to perform one or more operations, such as the operations described in this disclosure. These program instructions can define, and/or be part of, a discrete software application.

In some instances, the computing system 300 can execute program instructions in response to receiving an input, such as an input received via the communication interface 306 and/or the user interface 308. The data-storage unit 304 can also store other data, such as any of the data described in this disclosure.

The communication interface 306 can allow the computing system 300 to connect with and/or communicate with another entity according to one or more protocols. Therefore, the computing system 300 can transmit data to, and/or receive data from, one or more other entities according to one or more protocols. In one example, the communication interface 306 can be or include a wired interface, such as an Ethernet interface or a High-Definition Multimedia Interface (HDMI). In another example, the communication interface 306 can be or include a wireless interface, such as a cellular or WI-FI interface.

The user interface 308 can allow for interaction between the computing system 300 and a user of the computing system 300. As such, the user interface 308 can be or include an input component such as a keyboard, a mouse, a remote controller, a microphone, and/or a touch-sensitive panel. The user interface 308 can also be or include an output component such as a display device (which, for example, can be combined with a touch-sensitive panel) and/or a sound speaker.

The computing system 300 can also include one or more connection mechanisms that connect various components within the computing system 300. For example, the computing system 300 can include the connection mechanisms represented by lines that connect components of the computing system 300, as shown in FIG. 3.

The computing system 300 can include one or more of the above-described components and can be configured or arranged in various ways. For example, the computing system 300 can be configured as a server and/or a client (or perhaps a cluster of servers and/or a cluster of clients) operating in one or more server-client type arrangements, for instance.

As noted above, the content-presentation device 106 and/or 202 and/or components thereof can take the form of a computing system, such as the computing system 300. In some cases, some or all these entities can take the form of a more specific type of computing system. For instance, in the case of the content-presentation device 106 and/or 202, it can take the form of a desktop computer, a laptop, a tablet, a mobile phone, a television set, a set-top box, a television set with an integrated set-top box, a media dongle, or a television set with a media dongle connected to it, among other possibilities.

C. Example Data Architecture

Figure 4A:
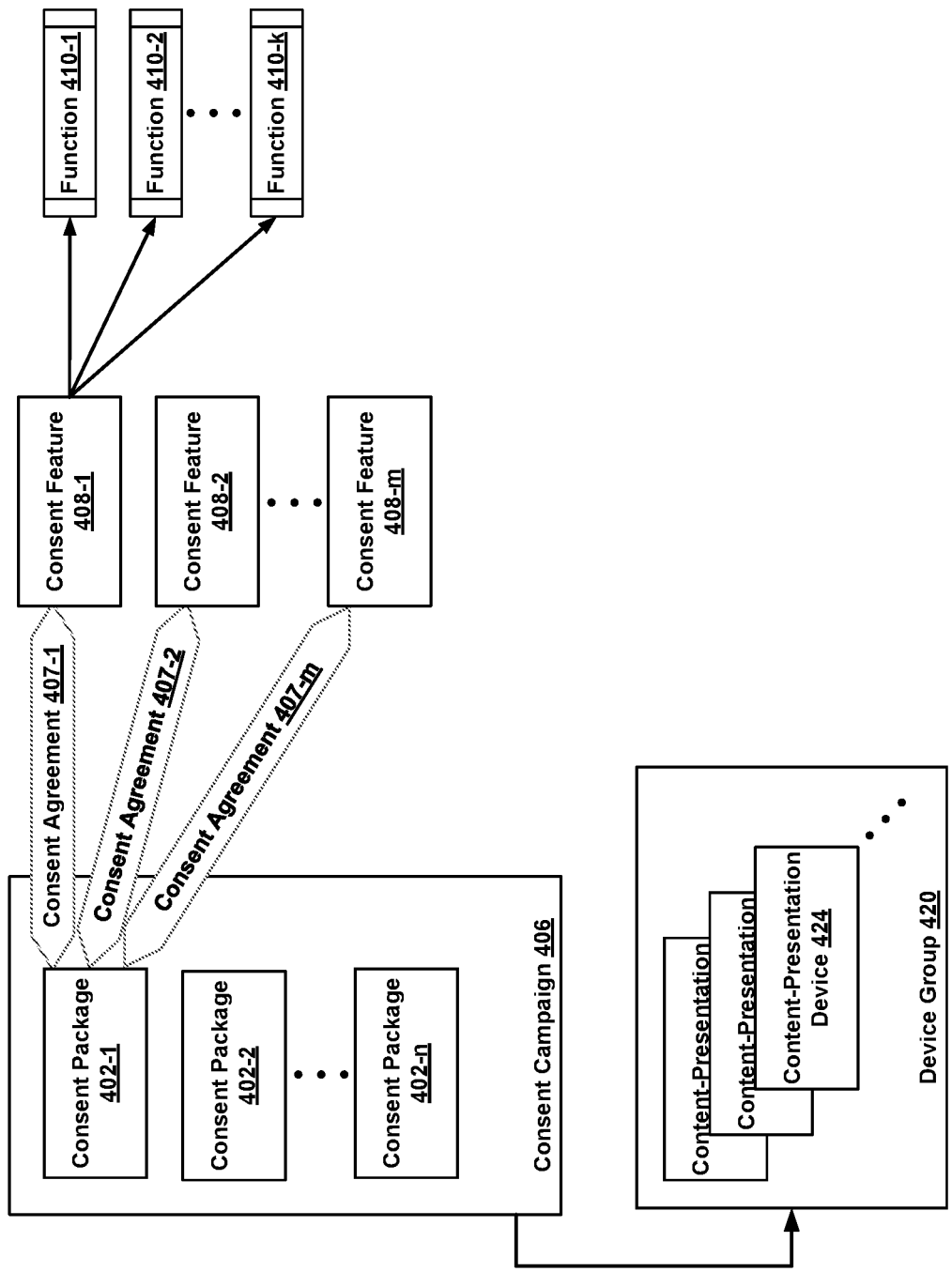
FIG. 4A illustrates a high-level data architecture for consent management, in accordance with example embodiments.
Figure 4B:
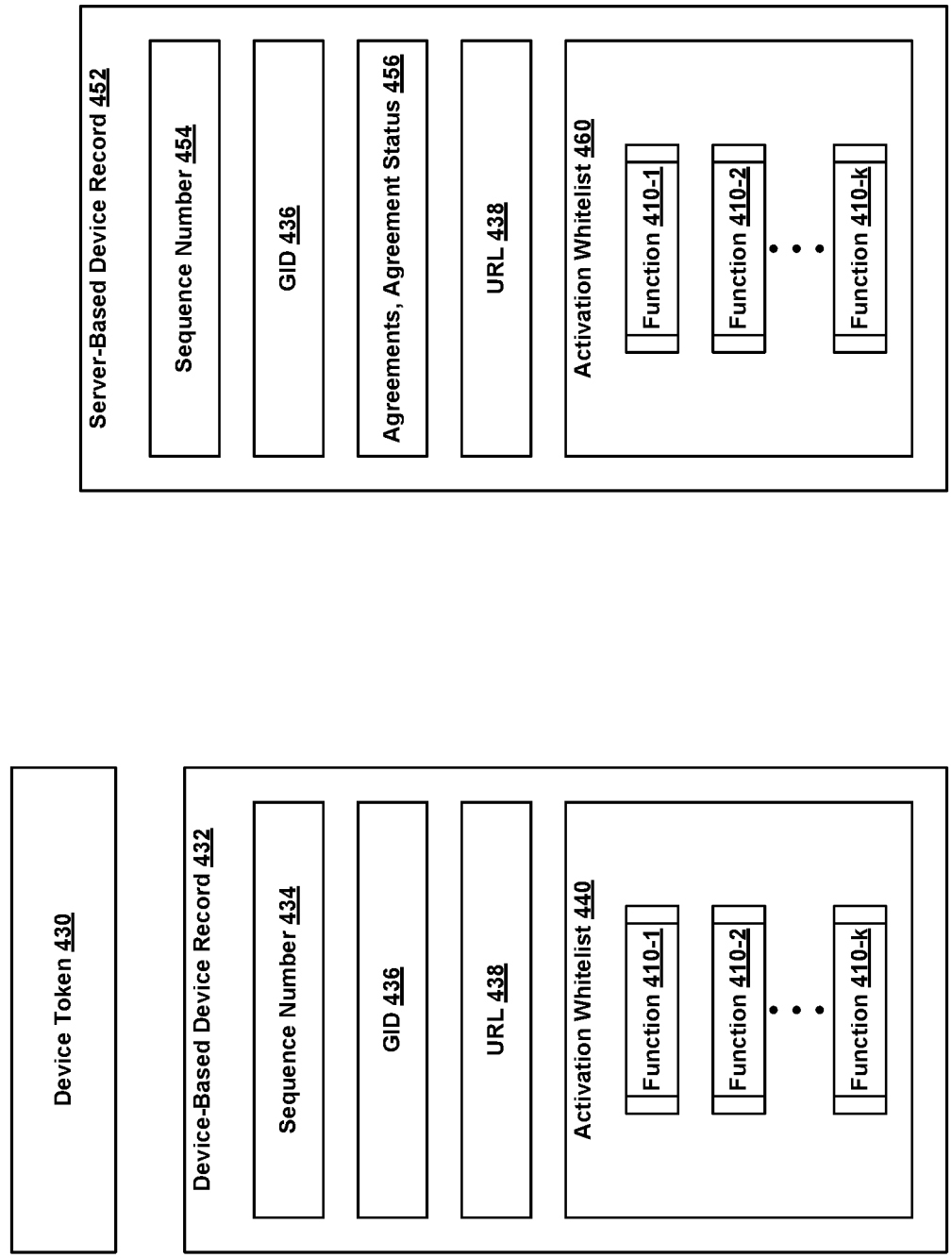
FIG. 4B depicts example data records used for consent management, in accordance with example embodiments.

FIGS. 4A and 4B illustrate certain aspects of an example data architecture and organization that may be used in a consent management system 100 to manage various aspects of consent and consent-related operations. More particularly, FIG. 4A illustrates an example organizational structure of consent management elements, and how they are related. One or more services, such as content replacement, that require user consent to be made operational for a particular content-presentation device may be associated with a consent package. A consent package may, in turn, include one or more consent features, and each consent feature may be associated with one or more consent functions, which are the actual device-based and/or cloud-based functions and/or application programs that are invoked or executed in order to implement operation of the service or services. In order for a service to be operational, its associated functions must be activated by a user, thereby giving them consent to do so. Consent management involves managing the various combinations of consent features and functions that apply to each individual content-presentation device, as well as user selections that have been or need to be made for each device.

As shown in FIG. 4A, a consent package 402-1 may be associated or identified with consent features 408-01, 408-2, . . . , 408-m by way of consent agreements 407-1, 407-2, . . . , 407-m, respectively. Each consent agreement includes or may be linked to specific verbiage that describes, in human-readable language, the meaning and terms of consenting to the agreement. In addition, the verbiage may also be compliant with rules, regulations, and/or laws of one or more particular jurisdictions. Jurisdictions may be associated with geographic location, areas, or regions, for example. Compliance may also apply to services encompassed by the consent features. Thus, a consent package may be "constructed" by identifying it to consent features by way of consent agreements.

As also shown, consent feature 408-1 is associated with functions 410-1, 410-2, . . . , 410-k. These functions, which may themselves each be made up of one or more sub-functions, represent and/or link to executable code or instructions that carry out various aspects of a service. Similarly, each of consent of features 408-2, . . . , 408-m may also be associated with one or more functions, although this is not explicitly shown in the figure.

Multiple consent packages may be group together into a consent campaign. In the example of FIG. 4A, consent package 402-1 is grouped with consent packages 402-2, . . . , 402-n in consent campaign 406. In turn, consent campaign 406 may be associated with collection of devices 424 . . . that make up a device group 420. In the context of FIG. 4A, devices 424 . . . represents some form of identifiers of actual devices, and device group 420 represent a listing or other data structure of the identifiers. A consent campaign may define and organize common aspects of consent packages, features, agreements, functions for one or more groups of content-presentation devices. In an example embodiment, the group may be a collection of devices made having the same manufacturer, possibly same model number or other sub-categorization of the manufacturer, and same jurisdiction, among other commonalities that determine their membership in the group. A device group associated with a particular consent campaign are referred to herein as "target devices," and an individual content-presentation device that is associated with a campaign is referred to as a "target device." A device that is a target of consent campaign can also be considered a target of the consent packages, agreements, features, and functions that are part of the campaign.

The association of a group of devices or any individual device within a device group with a consent campaign does not necessarily by itself determine if any of the services associated with the campaign are activate or enabled. But it does at least identify what consent agreements need to be accepted in order for the services to be activated. In example embodiments, there may also be granularity to consent agreements, such that only certain aspects of a given service may be activated.

The organizational structure of consent campaigns, packages, and agreements also provides a powerful and flexible way for administrators of consent management to create, modify, and update the elements of the organizational structure. As will be described below, other aspects of the data architecture, in particular device records maintained on devices and in the cloud, enable efficient and comprehensive tracking and monitoring of the status of acceptance and/or rejection of user consent to services and features on all devices registered in the consent management system.

It should be understood that the illustrations of the organizational structure of data in FIG. 4A may represent a simplified rendering of an actual implementation, and that there may be other and/or different data elements and components, besides those shown.

FIG. 4B illustrates example device records configured for storage on devices and in the cloud. For any specific individual device, these records are arranged to contain actual consent choices made by a user, and which, for the specific device on which the device record is stored, apply to activating or not activating functions that make up particular services. In some examples, the functions may be pre-installed on a device in an initially disabled and/or deactivate state by the device manufacturer, and only enabled and/or activated by a user's explicit choice to do so via a procedure described below. By maintaining a device-based device record 432 on the device and a corresponding server-based device record 452 in the cloud, and periodically checking and, if necessary, updating synchronization of the records, the consent status of a device may be kept up to date with potential changes to consent campaigns, features, agreements, and functions, for example. As described below by way of example, the device records also support efficient and comprehensive operations for obtaining user consent choices and maintaining synchronization.

FIG. 4B also depicts a device token 430, which uniquely identifies the device to the consent management platform as having been authenticated by the platform. More specifically, the device token 430 is generated and cryptographically-signed by the consent management platform when a device first registers, and then provided to the device for expediting future secure communications between the device and the platform. Other elements of the device records in FIG. 4B are describe below in connection with example operation.

III. Example Operations

The consent management system 100 and/or components thereof can be configured to perform and/or can perform one or more operations. Examples of these operations and related features will now be described.

Example operation of the consent management system 100 may be described in terms four high-level processes. Namely, consent provisioning, device registration, user consent-choice selection, and device check-in and synchronization. It should be understood that various aspects of each of these high-level processes may overlap, and the specification of these four high-level processes should not be viewed as limiting and/or restrictive of other possible organizational descriptions of the operations involved in consent management as described herein.

Consent provisioning is a process by which a consent administrator creates and defines consent campaigns, consent packages, consent features and agreements, and links to consent functions. It is carried out primarily, and possibly entirely, on the consent management platform, and therefore involves mostly or only cloud-sided operations. Device registration is a process by which a device makes itself known to the consent management platform, and in so doing, becomes an element of the consent management system (as defined in the context of system 100 of FIG. 1, for example). User consent-choice selection is a process by which a user of a particular device is made aware of consent options, and prompted to select or choose to accept or reject (or decline) consent from among the available options. Device check-in and synchronization is a process by which consent choices made for each registered device are kept current in view of various factors that may require updating of consent choices. Each of device registration, user consent-choice selection, and device check-in and synchronization involves both cloud-side and device-side operations.

Figure 5A:
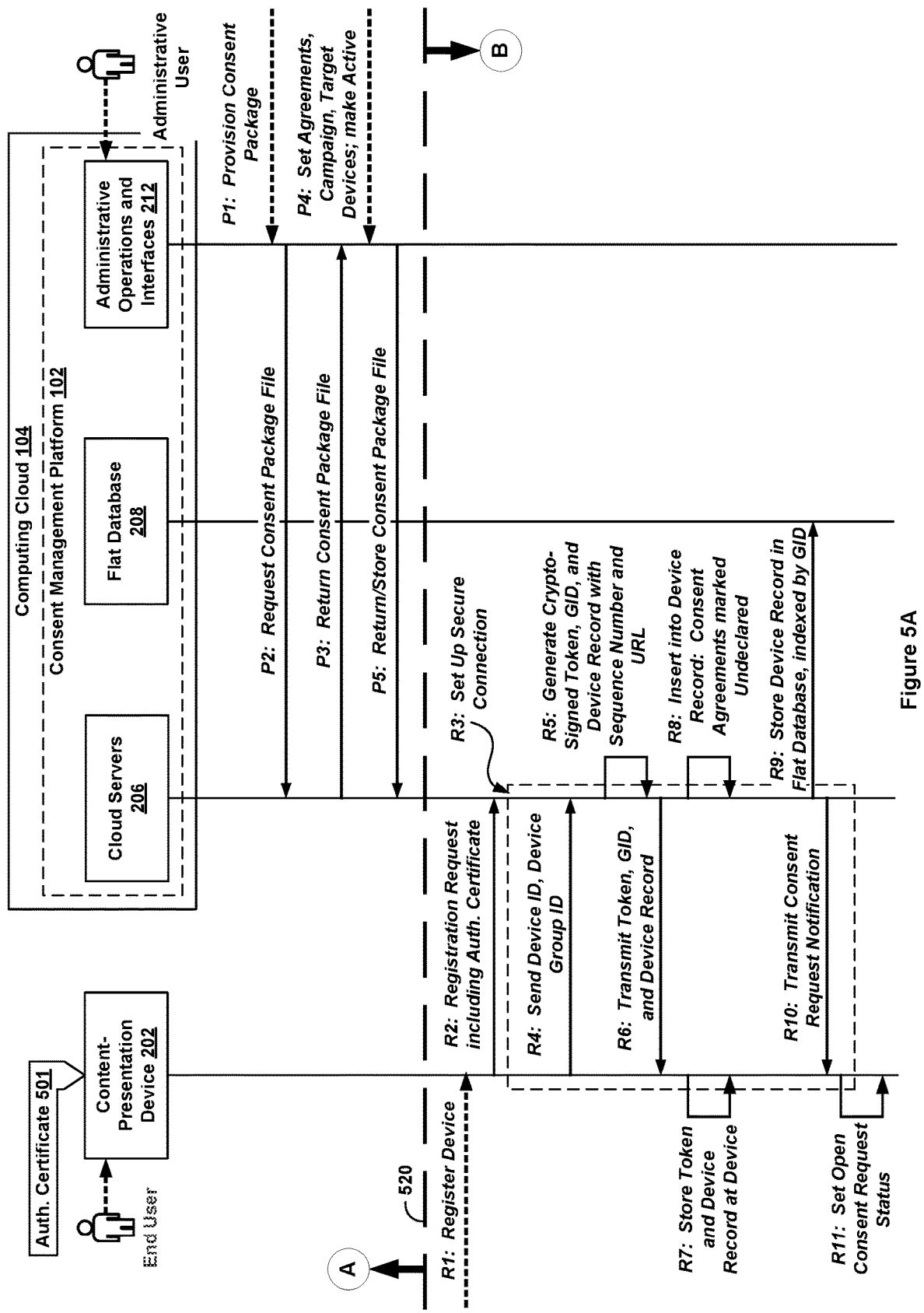
FIGS. 5A and 5B collectively make up an example operational flow diagram showing operations of various aspects of an example consent management system, in accordance with example embodiments.
Figure 5B:
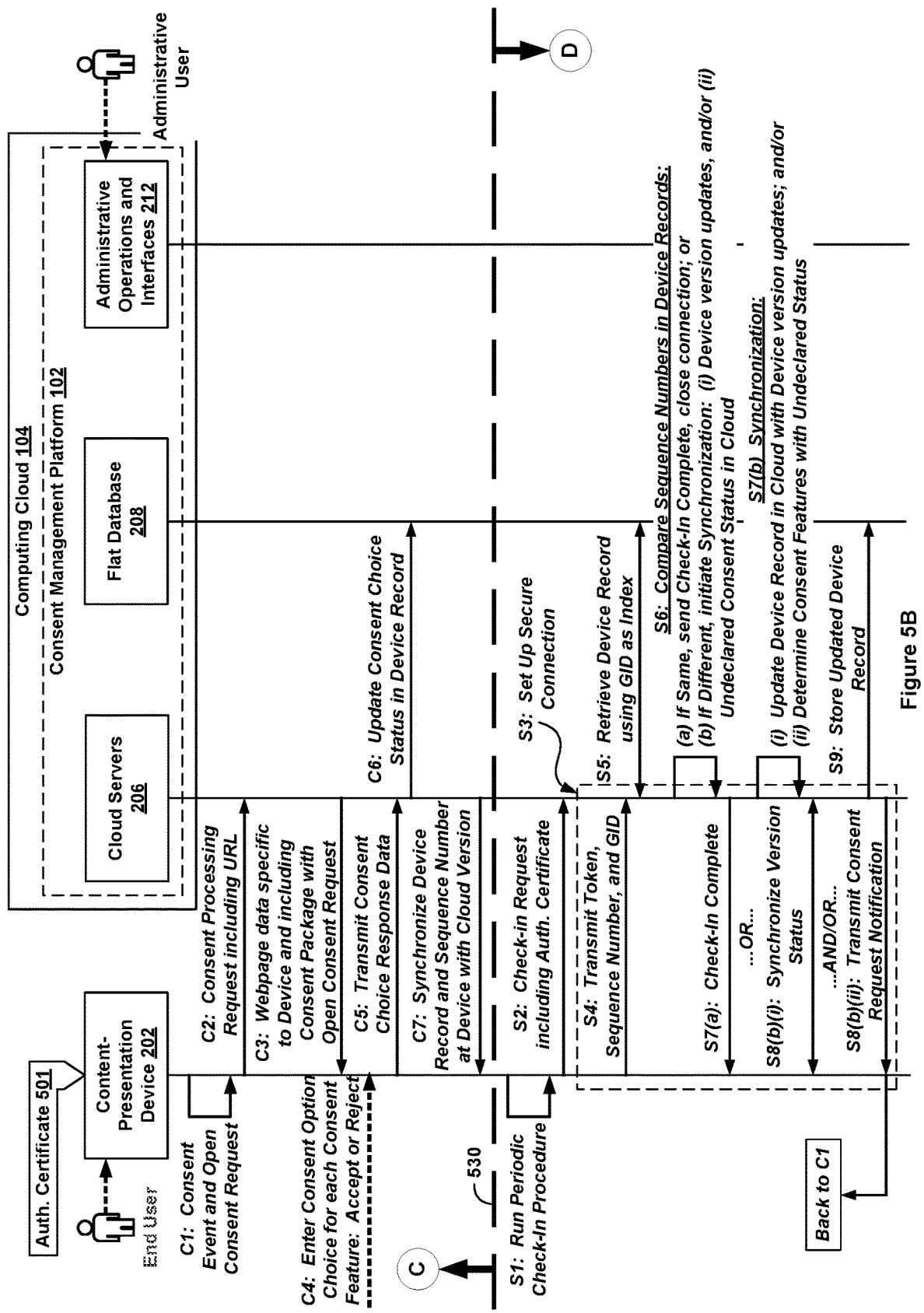

The four high-level processes may be described by way of example with reference to FIGS. 5A and 5B, which collectively make up an example operational flow diagram showing operations of various aspects of an example consent management system, in accordance with example embodiments. Both figures depict rough operational sequence timelines for the content-presentation device 202, cloud servers 206, flat database 208, and administrative operations and interfaces 212, the last three items of which are part of the consent management platform 102, which is disposed in the computing cloud 104, as indicated. A vertical timeline extends below each component, with time increasing downward. The timelines are not intended to convey or represent precise timing, but rather an ordering or sequence of operations. The operations are shown as horizontal directed arrows between pairs of components, and labeled according information passed between them. Some operations are shown as self-directed arrows for operations that are carried out at one component, without necessarily involving passing information to another component.

Each of the high-level processes is depicted on a different sequence section of the timelines. Provisioning and device registration are shown in FIG. 5A. A horizontal dashed line 520 divides the two process, with a label "A" above the line 520 indicating the timeline portion corresponding to the operational flow of the provisioning process, and the label "B" below the line 520 indicating the portion of the timeline corresponding to device registration. User consent-choice selection, and device check-in and synchronization are shown in a similar manner in FIG. 5B. A horizontal dashed line 530 divides the two process, with a label "C" above the line 520 indicating the timeline portion corresponding to the operational flow of the user consent-choice selection, and the label "B" below the line 520 indicating the portion of the timeline corresponding to device check-in and synchronization. The ordering of the four high-level processes in FIGS. 5A and 5B is for convenience in the present discussion, and should not be viewed as limiting with respect to example embodiments described herein.

An example consent provisioning process is illustrated in timeline portion A in FIG. 5A, and involves operations P1-P5 between the cloud servers 206 and the administrative interface 212, as shown. The administrative interface 212 provide an interactive user interface, such as a browser, to an administrative user, show to the right of administrative interface 212. In the example, the administrative user may invoke a process P1 for provisioning a consent package. The administrative interface 212 may request a consent package file from a file server of the cloud servers 206 in operation P2, and the consent package file may be returned in operation P3. In operation P4, the administrative user may associate consent features and agreements to the package, assign the package to a consent campaign, and designate the campaign as active—the meaning of which is described below. In operation P5, the provisioned and configured package is returned to the file server. The term "file server" used herein may be taken to represent an example of data storage server or system, and not intended to be limiting with respect to example embodiments herein.

The operation P1-P5 represent an abbreviated version of provisioning operations. Further details are now described.

Information and data entered by way of the interface may be used to create one or more consent campaigns and consent packages are included therein. Consent packages may be stored in a file server on the consent management platform, and may be uploaded to the consent server and displayed in a browser. From the browser, an administrative user may configure or provision the uploaded consent package by associating it with consent features, which in turn are identified with consent agreements. As described above, consent features may also be associated with consent functions. Once a campaign and/or package is configured, it may designated as "active" and returned to the file server.

Designating a campaign, package, or feature as "active" applies it to all target devices, such that its associated agreements are ready to govern operation of the associated functions once a user selects consent-choice options. Through various aspects of the other three high-level processes described below, user devices may be alerted to the options, and guide users through an interactive process for consent choice selection. An active campaign, package, or feature may thus be considered as "ready to use." It should be noted that the term "active" as applied to campaigns, packages, and/or features is not the same as "activate" as applied to consent functions of consent features on a device or in the cloud. The latter term applies to consent features to which a user has consented via accepting a consent choice. Acceptance of consent effectively gives permission for the associated functions to execute on the target device and/or in the cloud, and in this sense the functions are activated on the device and/or in the cloud. By contrast, a consent feature that is designated as active is one that is ready for, and possibly awaiting or already having, user consent-choice selection.

In creating and provisioning a consent package, an administrative user may customize its features with unique consent language, privacy policy and terms of services as necessary for the applicable jurisdiction. This information may be linked or associated with consent agreements. As constructed, a consent package includes or is associated with information needed to present user with consent requests relating to the consent features of the package. Presentation may include consent language, privacy policy, terms of service (if applicable) and other details such as layout, color and branding. Consent language may be human-readable text stored in a text file, for example. Further, multiple language versions of the consent language of any or all consent agreements, such as English, Spanish, French, Japanese, and so on, may be maintained for retrieval and display according to an appropriate language indicator provided and/or associated with each particular content-presentation device. Consent packages can be customized by model and jurisdiction, as required. A consent package can also be designed to allow the consumer to consent to some services and not others. Thus, while presentation to the user may be part of the consent-choice selection is a process, the consent package include the information to enact the user process.

In addition to creating and provisioning consent packages, and other elements of consent data infrastructure, provisioning may also support updating these elements. Updating may address changes to a jurisdiction and related changes to agreement language, for example. Other updates could include deactivating or reactivating a campaign, package, or feature, for example. These types of changes could affect all or some target content-presentation devices. Still other updates could revoke or reinstate consent choices already recorded for one or more target devices.

Device registration is a process by which a device makes itself known to, and registers with, the consent management platform. Device registration may be initiated by the device transmitting an authentication certificate in a registration request to the platform. The certificate may have been previously signed by a trust entity known to both the device and the platform. In example embodiments, the trust entity may be the device manufacturer, and the certificate may be installed in the device, for example in firmware, by the manufacturer. A non-limiting example of an authentication certificated is an X.509 certificate. Upon receiving the registration request, the device and platform may mutually authenticate using the certificate, and establish a trust relationship that includes or facilitates a secure communication connection between the two. The platform may then determine an appropriate device group and device group ID for the device based on information in the certificate and/or information sent by the device over the secure connection. Next, the platform may generate a global ID (GID) as a combination (e.g, a concatenation) of the device group ID and a random number, for example. The GID becomes a unique identifier for the device from among all devices known to the consent management platform, and it also embeds the device group identifier. In addition, the GID may be used as an index key into the flat database for rapid and efficient access to a server-based device record associated with the device, as described below.

An example device registration process is illustrated in timeline portion B in FIG. 5A, and involves operations R1-R11 between the content-presentation device 202, the cloud servers 206, and the flat database 208, as shown. The content-presentation device may provide an interactive user interface, such as a browser, to an end user, show to the left of the content-presentation device 202. Other forms of interactive interface could be used as well, such as simple dialog boxes, or the like. In an example embodiment, an authentication certificate 501 may be provided to or installed in the content-presentation device. At operation R1, the end user may invoke the registration process, which sends a registration request including the certificate 501 to the cloud servers 206 in operation R2. Using the certificate 501, a secure communicative connection is set up between the device 202 and the servers 206 at operation R3. Communications carried out over the secure connection as shown within a dashed rectangle.

In operation R4, the device 202 sends a device ID and group ID to the cloud servers 206 over the secure connection, and in operation R5 the servers 202 a cryptographically-signed token that is unique to the device, and enables the servers 202 to quickly and uniquely identify the device in future communications as having been registered and certified by the consent management platform. In operation R5, the servers 202 also generate a GID for the device, and device-based device record that includes a sequence number and a device-specific URL (or other form of web-address indicator). The GID is generated by the servers 206 as described above, as is the device-based device record. The device-specific URL may be used by the device to establish subsequent secure interactive communication sessions, such as web-based communications, with the consent management platform 102 for user selection of consent options, as described below. In operation R6, the servers 206 transmit the device token, GID, and device-based device record to the device 202, which stores these received items locally on the device in operation R7. The token may be used by the device 202 to certify its unique identification in subsequent secure communication sessions with the consent-management platform for device check-ins, as also described below.

In operation R8, the servers 202 generate a server-based device record that includes the information in the device-based device record, and determine which consent campaigns, packages, features and agreements apply to the device 202, based on its GID, for example. The identified consent agreements may be added to the server-based device record, initially marked as undeclared. In operation R9, the server-based device record may be stored in the flat database, using the GID as an index for subsequent access to the record.

In operation R10, the servers 206 transmit a consent notification request to the device 202, indicating that at least one consent agreement is marked undeclared. In operation R11, the device 202 sets an open consent request status in response to the consent request notification. As described below, the open consent request will cause the device to launch the user consent-choice selection process upon an occurrence of a device consent event, as described below.

User consent-choice selection is a process by which user input data indicating selection of consent-choice options is obtained and processed and recorded by the consent-management platform in order to put the user's choices into effect. The consent-choice selection includes a launching action that navigates the content-presentation device 202 to a device-specific webpage, followed by operations of presenting consent options of consent packages targeted to the device, guiding the user through the associated agreements, including display of terms and conditions configured during provisioning, and obtaining the user's choices via interactive selection functions of the webpage. The device may navigate to the device-specific webpage using the device specific URL returned in the registration process.

While the example operations are described as involving URL and webpage display, it should be understood that other implementations of a device-specific unique identifier for accessing and retrieving remotely-stored consent-package information, as well as other implementations of interactive user displays, may be used. For example, a device-specific unique identifier could be or include a network address of a file server, or the like, that stores consent-package information specific to a device. And an interactive display could be or include a simple browser or even simple dialog boxes for receiving user input. Accordingly, the description of example operations in the context of URLs and webpage displays are illustrative and presented by way of example, and are not intended to be limiting with respect to example embodiments herein.

The action that launches the user consent-choice selection process entails sending a consent-processing request that includes a device-specific identifier string that specifies a cloud-based location from which consent data specific to the device may be retrieved and used to display consent options at the device. By way of example, the location could correspond to a network address of webserver of the consent management platform 102, and the device-specific identifier string could be a URL that points to the webserver. The webserver may be one of the cloud servers 206, for example. Again, other types of servers besides a webserver could be used. As discussed above, the example of a webserver, URL, and webpage display that is generally used throughout the present disclosures is not intended to be limiting with respect to example embodiments herein.

In the example operation flow of FIG. 5B, a condition that causes the process to launch is occurrence of a consent event while the device has an open consent request. This scenario ensures that the user consent-choice selection process will be invoked when there are changes or updates to campaigns, packages, and/or features that require updated consent. In this case, the URL request received at the consent management platform is referred to as "solicited," since it is triggered by a condition set by the consent management platform. The user consent-choice selection process can also be launched by a user action to review existing agreement status, even if there have not been any changes or updates that would otherwise require updated consent. In this case, the URL request received at the consent management platform is referred to as "unsolicited," since it is triggered by user input, independently of any condition that may have been set by the consent management platform. While the URL is the same for both solicited and unsolicited requests, the formal request to the webserver that includes the URL may distinguish whether the request is responsive to a consent request notification or a user request to review consent options.

An example user consent-choice selection process is illustrated in timeline portion C in FIG. 5B, and involves operations C1-C7 between the content-presentation device 202, the cloud servers 206, and the flat database 208, as shown. Again, the content-presentation device may provide an interactive user interface, such as a browser, to an end user, shown to the left of the content-presentation device 202. In operation C1 on the device 202, a device consent event occurs while an open request is pending. This causes the user consent process to be launched, which includes sending a webpage request that is or includes the device-specific URL to the servers 202 in operation C2. Non-limiting examples of device consent request include receipt of a consent request notification or a user action that invokes a particular feature or function on the device 202.

In operation C3, a webserver that may be one of the servers 206 returns webpage data specific to the device 202, and including data relating to the consent package that includes consent feature(s) associated with the open consent request. This operation includes or results in presentation of an interactive user interface, such as a web browser, at the content-presentation device 202. More particularly, a webpage or series of webpages may be displayed that walk the end user through the consent process. Each agreement may be shown to the user, and the user may be prompted to either accept or reject (or decline) consent to the feature identified with agreement. Part of the process may include displaying the language of the agreement, as set during the provisioning process. Although shown explicitly, the webpage request may include a language indicator for the device. The language indicator may be used by the webserver to determine which of possibly multiple language versions (e.g., English, Spanish, French, Japanese, etc.) of any agreements should be displayed. In operation C4, the user may enter (or select) one of the binary choices (accept or reject) of each consent option. In operation C5, the user's input data including the selected options are returned via the secure web session to the web server in consent management platform In operation C6, the server-based device record is updated with the user's selections. More particularly, a server-based activation whitelist is either added to the server-based device record if no activation whitelist already exists, or an existing server-based activation whitelist is updated according the user's choices. The server-based activation whitelist includes a list the consent functions associated with the consent features for which the consent choice designates user acceptance is added to the server-based device record. If server-based activation list already exits, it is modified to include new accepted consent choices that were not previously in the existing whitelist, and/or to delete previously-accepted consent choice that were rejected by the user in the most recent consent process. The functions identified in the server-based whitelist may be server-side or cloud-side functions associated with delivering services associated with consented-to features. The operation C6 may also include storing identifications of corresponding device-side functions that are associated with the consent-to features. In this way, the consent management platform keeps a record of the device functions to which the user as consented.

In operation C7, synchronization data is sent from the servers 206 to the device 202 that causes the device to update its device-based device record to include information that corresponds to the server-based device record. In particular, the synchronization data includes the same identifications of device-side functions stored at the platform in operation C6. These identifications are then used to update the device-base activation whitelist at the device (or to store a new one if it did not previously exist on the device). This process is part of what is considered synchronization. It also includes setting the device-based sequence number in the device-based device record to the same value as the server-based sequence number in the server-based device record. As described below, during device check-in, agreement or disagreement between the device-based sequence number and the server-based sequence number may be used as a very fast and efficient way to quickly, with little processing and/or data access overhead, determine whether or not device synchronization is required.

After the consent-choice selection is a process has completed, the secure web session may be removed. The now-updated device-based activation whitelist will include identifiers (e.g., names and/or links) of functions that carry out various aspects of consent features to which the user consented (i.e., selected acceptance of consent). Inclusion in the activation whitelist gives permission for the functions in the list to execute as necessary on the device when the associated consent features are invoked. The now-updated server-based activation whitelist may include identifiers of the device-based functions, as well as information about cloud-side operations associated with the consent-to features. This information may be used to give permission for these operations to be carried out as necessary for delivery of the associated service(s) to the particular content-presentation device. The term "whitelist" as used herein should be understood to describe or specify a list, table, or the like, that associates some form of permission with items in the list. For example embodiments of consent management, the list items identify functions associated with consent features. Other terms for "whitelist" may be used as well, such as "allowlist."

Device check-in and synchronization is a process by which devices are kept current of updates and/or to campaigns, packages, and/or features that require updated consent, and by which the consent management platform is kept current of changes or updates to the devices, including device changes or updates that both do and don't require updates to consent agreements and associated user choices. When both the device and the consent management platform are current with respect to shared, corresponding, and/or complementary information relating to consent status and/or device updates, they are considered to be synchronized. When this is not the case, they are considered be out of synchronization. The check-in process entails a periodic check-in procedure in which the device 202 contacts the server 206, providing information that enables the server to rapidly and efficiently identify the device and determine the platform and the device are synchronized or out of synchronization. Device check-in and synchronization is initiated by the device periodically (or episodically). Doing so helps ensure that changes or updates that need to be addressed will be discovered. The description below applies to one instance or invocation of the procedure.

Check-in is carried out over a secure communication session established using the authentication certificate and further certified with the device token returned the device during the provisioning process. The device token enables the consent management platform to positively confirm that the device is exactly who it claims to be. The device also provides data that includes or indicates its device-based sequence number and GID, which enables the consent management platform to quickly and efficiently determine the mutual synchronization state. When the consent management platform determines that the shared/complementary information is synchronized, it sends a check-in complete message to the device and removes the secure connection. This completes the check-in procedure, and in this case no synchronization operations are necessarily needed or carried out. When the consent management platform determines that the shared information is out of synchronization, it launches a synchronization procedure that either addresses a need to update consent choices for the device, updates device information stored in the cloud relating to software versions and/or other changes to the device, or both.

An example device check-in and synchronization process is illustrated in timeline portion D in FIG. 5B, and involves operations S1-S9 between the content-presentation device 202, the cloud servers 206, and the flat database 208, as shown. In operation S1, the device 202 launches one instance of the check-in procedure, which begins with a check-in request including the authentication certificate 501 to the cloud servers 206 in operation S2. The authentication certificate 501 is used to establish a secure communicative connection between the device and the servers in operation S3. The device then transmits the token over the secure connection in operation S4. This transmission also includes the device-based sequence number and the GID. The token enables the servers 206 to positively certify the device's identity as well as to be able to trust any data it receives over the secure connection as originating from the device and pertaining to the device. In operation S5, the cloud servers 206 use the GID as an index into the flat database 208 to retrieve the server-based device record, which includes the server-based sequence number.

In operation S6, the server compares the server-based sequence number with the device-based sequence number to determine whether or not the synchronization procedure needs to be run. If the two sequence numbers are the same, as indicated in operation S6(a), then the device and the server have synchronized data, so no further data synchronization is needed. In this case, the cloud servers 206 send a check-in complete message in operation S7(a), and removes the secure connection to complete the check-in procedure.

If the two sequence numbers are not the same, as indicated in operation S6(b), then the device and the server are deemed to be out of synchronization, and the synchronization procedure needs to run. At least one of two types of synchronization may be needed, as determined and carried out by the server 206 in one or both of operations S7(b)(i) or S7(b)(ii). More specifically, if the device-based device record indicates an change or update to the device, such as a new software version, that has not been recorded in the server-based device record, as indicated in operation, then the server updates the server-based device record with the device-update information in the device-based device record in S7(b)(ii). Then in operation S8(b)(i), the server and the device synchronize the respective sequence number in their respective device records by setting the two sequence numbers to the same value.

If one or more campaigns, packages, features, and/or associate agreements have been update since the last device check-in (assuming the device and the platform were previously synchronized) as indicated in operation S7(b)(ii), then the server may transmit a consent request notification to the device in operation S8(b)(ii). The server may determine the need for updated consent choices from the device by finding one or more consent agreements with undeclared status in the server-based device record. This could be the result of an earlier provisioning action. For example, a consent package may have been updated such that one or more agreements changed in a manner that now requires a new user selection. Setting the changed agreement's status to undeclared during provisioning may thus serve as an alert during synchronization that new user selection is needed. After the consent request notification is sent in operation S8(b)(ii), a subsequent launch of the user consent-choice selection process may be triggered in operation C1, as described above.

In operation S9, the updated server-based device record may be stored back in the flat database 208. It may be noted that operations S7(b)(i) and S7(b)(ii), as well as operations S8(b)(i) and S8(b)(ii), are not necessarily exclusive. That is, synchronization may involve both types of operations. Also, in the context of the organizational description of the four high-level processes, the synchronization process for updating consent choices may appear to complete with the consent request notification. However, in accordance with example embodiments, this type of synchronization also involves the user consent-choice selection process to carry out the actual updating and synchronization of the server-based device record and the device-based device record.

Further, the description of the four high-level processes in connection with FIGS. 5A and 5B does not represent a complete and comprehensive inventory of all aspects of consent management that the consent management system 100 may carry out or perform. Other aspects of consent management may involve various arrangements of operations described in the context of the four high-level process. An example of another aspect includes deregistering or unregistering a device, for example by a factory reset action at the device. This may result in the device returning to an unregistered state in which it ceases check-ins, and instead initiates a new registration with the consent management platform on its next communication with the platform. During the new registration, the platform treats the device as if it has never before registered, generating a new token and other registration/consent data, as described above. The platform may deleted all previous cloud-side data it had created for the device, or it may retain the data in an "orphaned" state—i.e., having no currently known device with which to associate the data. Another aspect consent management could involve discovery during synchronization that a device has changed jurisdictions. This could be determined from location information of the device, such as its network address when contacting the server, or another geolocation method, such as GPS (global positioning satellite) system measurement. Determination of a change in jurisdiction could then cause the consent management platform to update consent agreements for the device accordingly, which may subsequently cause the user consent-choice selection process to be invoked. Other examples are possible as well.

In accordance with example embodiments, a given content-presentation device may have multiple instances of consent data corresponding to multiple jurisdictions from which it has checked in. Also in accordance with example embodiments, not all updates to consent campaigns or packages may necessarily require updated consent choices from a device. For example, some changes to consent agreement language may not effect terms in a manner that require the user to update all or any associated consent options. An updated package may necessitate some updated choices and leave others untouched.

The use of the GID to access the server-based device record from the flat database 208, and application of the comparison of the server-based sequence number and the device-based sequence number, advantageously enables very efficient and rapid determination of the mutual synchronization state of the content-presentation device 202 and the consent management platform 102. This approach is particularly beneficial in view of the very large number of content-presentation devices that may require consent management and the periodicity with which device check-in is carried out.

FIGS. 6A, 6B, 6C, and 6D depict example webpage displays of a content-presentation device relating to operations of a consent management system, in accordance with example embodiments. In an example embodiment, the webpages may be displayed on a smart TV device, for example, that has an internet connection or other communications network connection. A uses may navigate the webpages using a remote control device or other input device, such a keyboard.

Figure 6A:
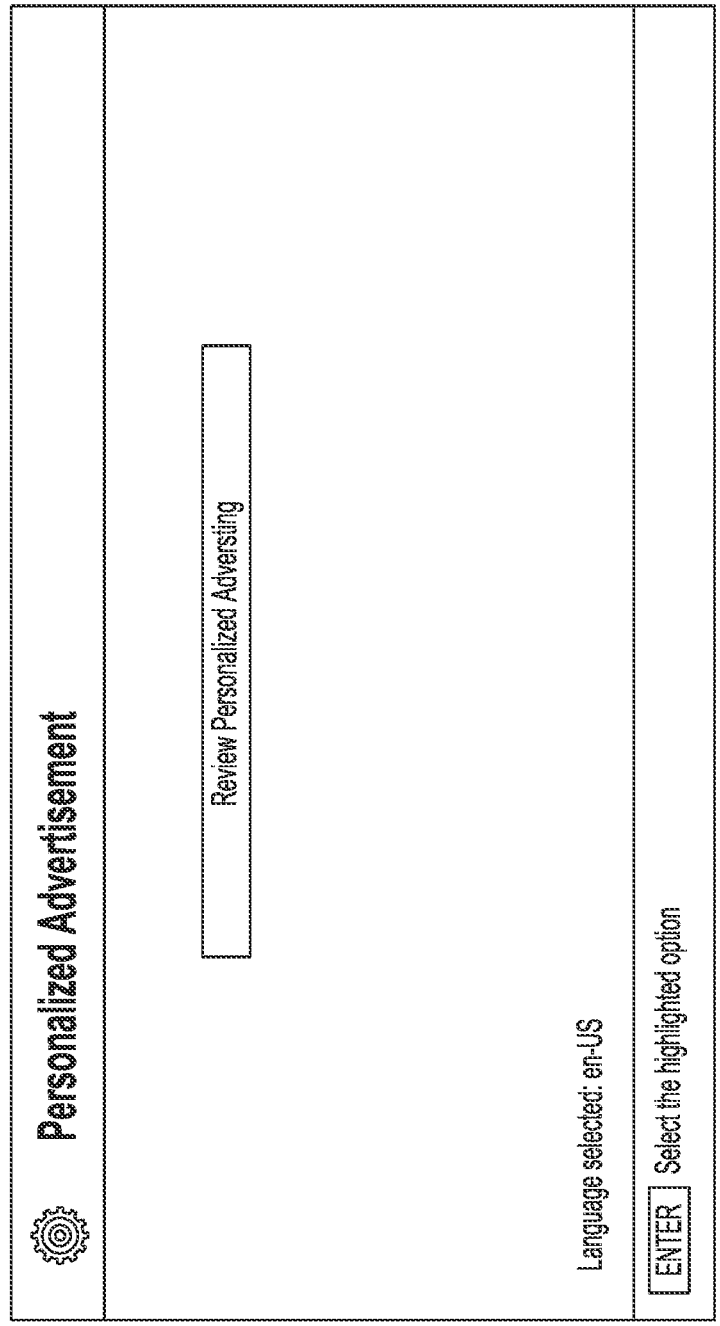
FIGS. 6A, 6B, 6C, and 6D depict example webpage displays of a content-presentation device relating to operations of a consent management system, in accordance with example embodiments.

FIG. 6A shows an example webpage that may be displayed at the start of a web session for user selection of options relating to personalized advertising. In this example, a user may be prompted to review options by selecting "Review" and clicking the "Enter" button on the display.

Figure 6B:
Figure 6C:

FIG. 6B shows an example webpage that displayed according to a personalized advertising consent package. The language of the agreement (shown in the figure as "gibberish" text for illustrative purposes only) is displayed for the user's review. As described above, consent agreements may be presented in any one of one or more languages, depending on a language indicator or other information provided by the device. Selection options are presented below the agreement language. There is also a selection for reviewing more details about personalized advertising. In example embodiments, clicking this selection may display details on a separate webpage, as illustrated in FIG. 6C. The user may return to the webpage of FIG. 6B by clicking the "Back" button on the webpage of FIG. 6C. In this illustration, a user may then check "Enable" or "Disable" for each feature of the consent package displayed in FIG. 6B. Once consent choices have been checked, they may be entered and recorded by clicking the "Enter" button on the display.

Figure 6D:
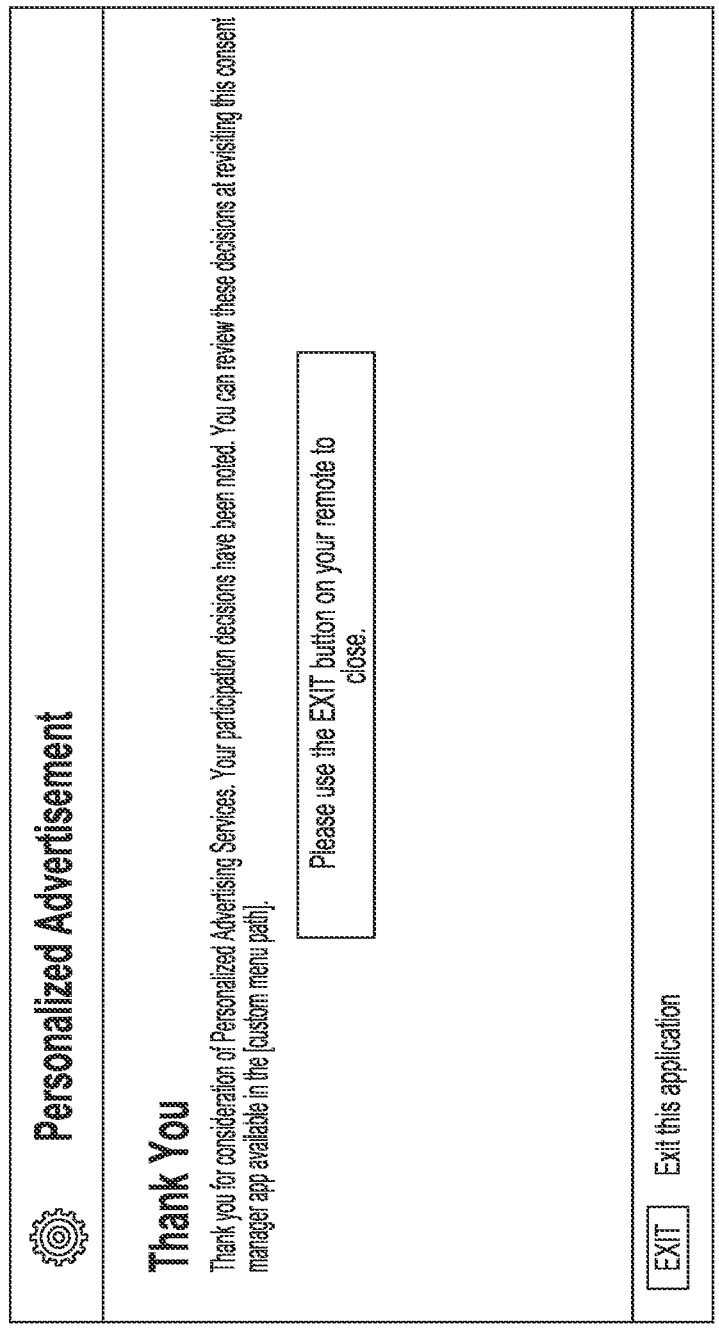

FIG. 6D shows an example webpage for completing the user selection process. The user may signal completion by clicking the "Exit" button on the webpage display. In this example, the webpage display evidently assumes the user is using a remote control device. However, other input device may be used as well.

FIGS. 7A, 7B, 7C, and 7D depict example webpage displays of a server of a consent management system, in accordance with example embodiments. In particular, these webpages may be displayed on a display component of the administrative operations and interfaces 212 as part of the consent provisioning and configuration process, for example. It may be assumed for purposes of the present discussion that an administrative user is reviewing and entering information via webpages such as those shown.

FIG. 7A shows an example webpage for configuring whitelist items for a consent package relating to dynamic advertising and audience measurement. As shown by way of example, two items have been selected for configuration according to associated check boxes.

Figure 7B:
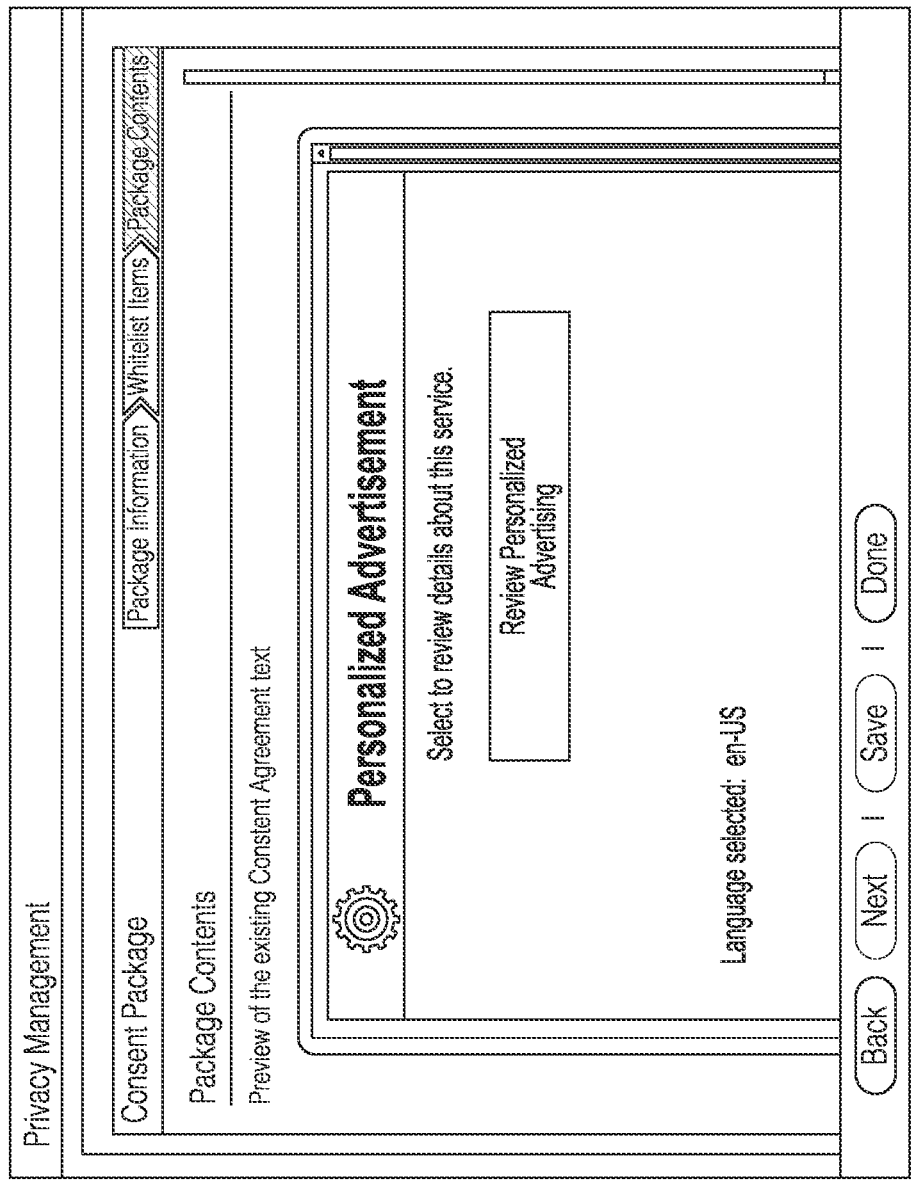

FIG. 7B shows an example webpage that presents a preview of webpage that will displayed on a content-presentation device. This allow an administrative user to evaluate and assess the form and format of what users will see.

Figure 7C:
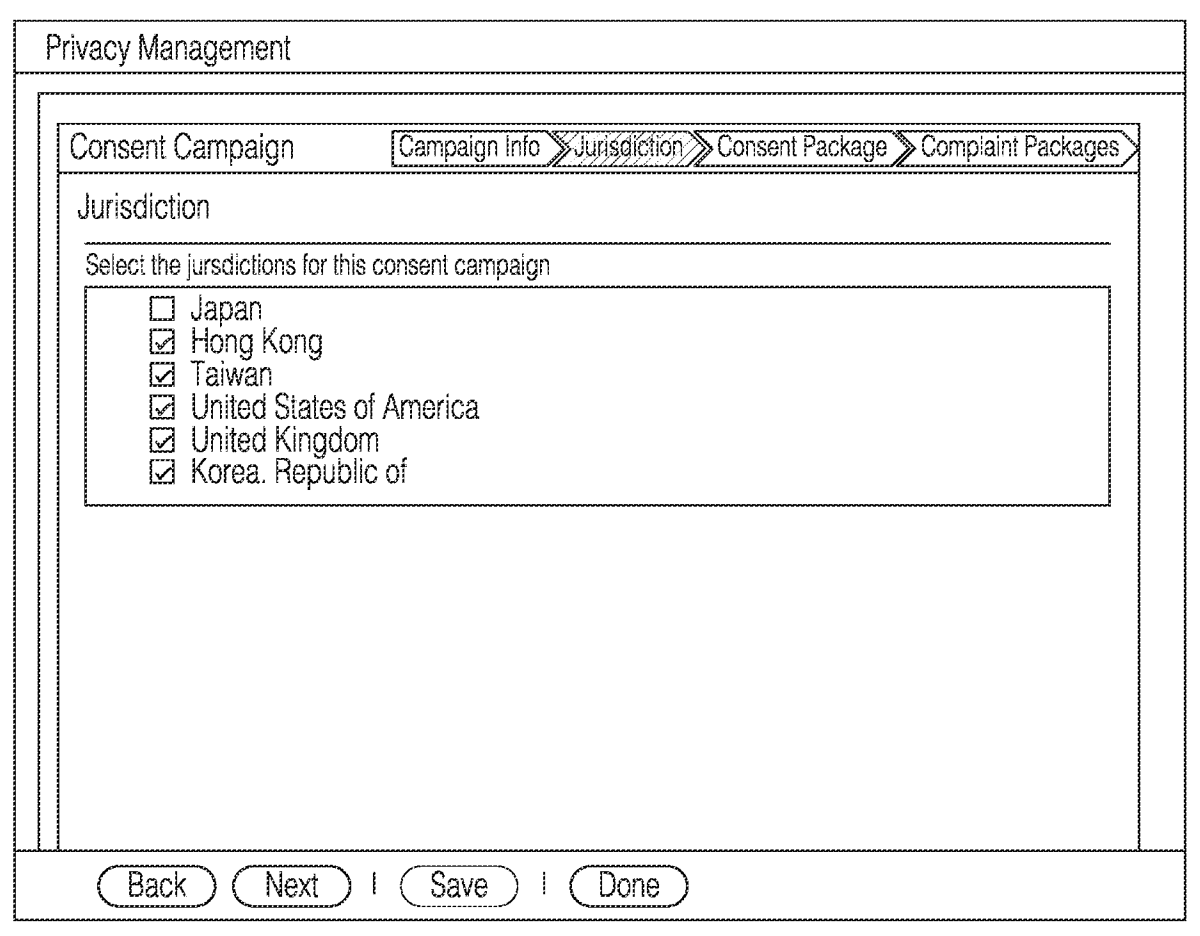

FIG. 7C shows an example webpage that presents options for jurisdictions for the associated consent campaign. Selections are made according to associated check boxes next to specific countries, which in this example server as jurisdictions. Other definitions of jurisdictions could apply as well.

FIG. 7D shows an example webpage that an administrative user might use to associated a consent package with a consent campaign.

The above example webpages of FIGS. 6A, 6B, 6C, and 6D, and of FIGS. 7A, 7B, 7C, and 7D, are presented for purposes of illustration. They are not intended, and should not be considered, limiting with respect to example embodiments described here.

IV. Example Method

The discussion above of example operation of a consent management system presented descriptions of four high-level processes that carry out various aspects of consent management, in accordance with example embodiments. Further details of user consent-choice selection are now described in connection with an example method.

Figure 8:
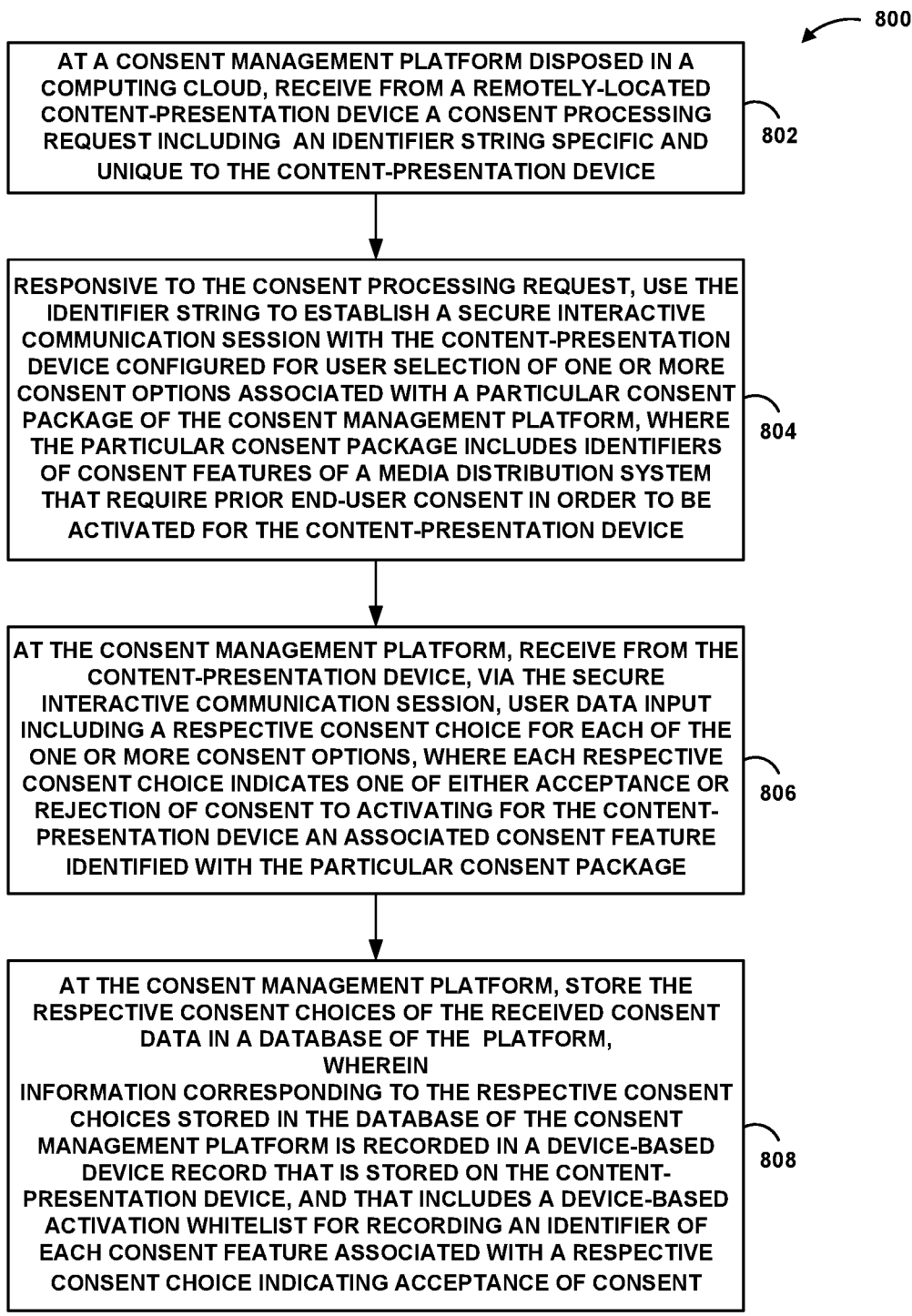
FIG. 8 is a flow chart of an example method.

FIG. 8 is a flow chart of an example method 800 of user consent-choice selection that could be carried out in connection with, or in the context of, a consent management system, such as that described above. The example method 800 could be implemented on and/or carried out by a computing system, such as computing system 300 described above, and/or a computing cloud, such as computing cloud 104 also described above. More particularly, the example method 800 could be implemented on and/or carried out by a consent management system including one or more processors, and non-transitory computer-readable storage medium and/or media having stored thereon program instructions that, upon execution by the one or processors, cause the consent management system to carry out operations including operations of example method 800.

At block 802, the method 800 includes receiving a consent-processing request at a consent management platform from a content-presentation device. The consent-processing request may include an identifier string specific and unique to the content-presentation device. The consent management platform may be disposed in a computing cloud, and the content-presentation device may be remotely located from the consent management platform.

At block 804, the method 800 includes, in response to the consent processing request, using the identifier string to establish a secure interactive communication session with the content-presentation device configured for user selection of one or more consent options associated with a particular consent package of the consent management platform. The particular consent package may include identifiers of consent features of a media distribution system that require prior end-user consent in order to be activated for the content-presentation device. In addition, the particular consent package may be one of one or more consent packages for which the content-presentation device has been designated as a target device by the consent management platform.

At block 806, the method 800 includes, receiving user consent data input at the consent management platform from the content-presentation device, via the secure interactive communication session. The user consent data input may include a respective consent choice for each of the one or more consent options, where each respective consent choice may indicate one of either acceptance or rejection of consent to activating an associated consent feature identified with the particular consent package. Activation applies to the content-presentation device.

Finally, at block 808, the method 800 includes storing the respective consent choices of the received consent data in a database of the consent management platform. Related to this action, information corresponding to the respective consent choices stored in the database of the consent management platform may also be recorded in a device-based device record that is stored on the content-presentation device. The device-based device record may include a device-based activation whitelist for recording an identifier of each consent feature associated with a respective consent choice indicating acceptance of consent.

In accordance with example embodiments, the identifier string that is specific and unique to the content-presentation device may be or include a uniform record locator (URL) for a web resource associated with the one or more consent packages. As such, using the identifier string to establish the secure web-based communication session with the content-presentation device may entail retrieving from a web server of the consent management platform webpage content specific to the content-presentation device using the URL, and establishing a secure web-based communication session.

In accordance with example embodiments, the database of the consent management platform may be or include a flat database storing a respective server-based device record associated with each of one or more respective content-presentation devices, including the content-presentation device. In the flat database, each respective server-based device record may indexed by a key that is unique to the associated respective content-presentation device, and each consent feature identified with the particular consent package may be identified by way of a respective consent agreement. With this arrangement, storing the respective consent choices of the received consent data in the database of the consent management platform may entail setting a status of each respective consent agreement in the server-based device record associated with the content-presentation device. Each status setting may be either accepted or rejected, according to the respective consent choice associated with the consent feature identified by the respective consent agreement. The storing operation may also involve synchronizing the server-based activation whitelist in the server-based device record that is associated with the content-presentation device with the device-based activation whitelist in the device-based device record on the content-presentation device. Storing may further involve synchronizing the server-based sequence number in the server-based device record that is associated with the content-presentation device with a device-based sequence number in the device-based device record on the content-presentation device.

In accordance with example embodiments, synchronizing the server-based activation whitelist in the server-based device record that is associated with the content-presentation device with the device-based activation whitelist in the device-based device record on the content-presentation may entail recording in both the server-based device record and the device-based device record the identifier of each consent feature associated with a respective consent choice indicating acceptance of consent. In addition, synchronizing the server-based sequence number in the server-based device record that is associated with the content-presentation device with the device-based sequence number in the device-based device record on the content-presentation may entail recording the same value for both the server-based sequence number and the device-based sequence number.

In accordance with example embodiments, a prior version of the server-based device record may be stored in the flat database prior to receiving the consent processing request. In this arrangement, synchronizing the server-based activation whitelist in the server-based device record that is associated with the content-presentation device with the device-based activation whitelist in the device-based device record on the content-presentation may further entail deleting from the prior server-based activation whitelist the identifier of any consent feature corresponding to a consent feature associated with a respective consent choice indicating rejection of consent.

In further accordance with example embodiments, the method 800 may further include operations prior to receiving the consent processing request. These prior operations may include receiving from the content-presentation device a check-in request including a device token previously cryptographically-signed by the server, a global identifier (GID) that is the unique key associate with the content-presentation device, and a prior version of the device-based device record. The prior operations may also include retrieving a prior version of the server-based device record associated with the content-presentation device using the GID as an index key into the flat database, and making a determination that the server-based activation whitelist in the prior version of the server-based device record associated with the content-presentation device is out of synchronization with the activation whitelist in the prior version of the device-based device record in the token. Then, in response to the determination, the prior operations may include transmitting a consent request notification to the content-presentation device. The consent request notification may be an indicator for causing the content-presentation device to transmit the webpage request.

In accordance with example embodiments, the method 800 may further include other operations prior to receiving the consent processing request. These other prior operation may include similarly receiving from the content-presentation device a check-in request that includes the device token previously cryptographically-signed by the server, a global identifier (GID) that is the unique key associate with the content-presentation device, and a prior version of the device-based device record. The other prior operations may also include retrieving a prior version of the server-based device record associated with the content-presentation device using the GID as an index key into the flat database, and making a determination that the server-based sequence number in the server-based device record associated with the content-presentation device has the same value as the device-based sequence number in the device-based device record on the content-presentation device. This time, the determination may indicate that the server-based activation whitelist in the server-based device record associated with the content-presentation device is synchronized with the device-based activation whitelist in the device-based device record on the content-presentation device. In this case, the webpage request may include or be an unsolicited request from the content-presentation device for initiation of an interactive web-based process for review of previous consent choices.

In further accordance with example embodiments, each respective consent agreement may be associated with a human-readable description of the respective agreement. With this arrangement, using the identifier string to establish a secure interactive communication session with the content-presentation device may entail determining a language associated with the content-presentation device, and providing to the content-presentation device, within the interactive communication session, the human-readable description in the language.

In accordance with example embodiments, the identifier of each given consent feature associated with a respective consent choice identify (i) one or more device functions of the given consent feature that are configured for carrying out device-side operations of the given consent feature, and/or (ii) one or more cloud functions of the given consent feature that are configured for carrying out cloud-side operations of the given consent feature.

In accordance with example embodiments, the content-presentation device may be a user device, such as a smart TV, for presentation reception and presentation of video media content and/or audio media content. Further, the consent features may be or include a feature suite, where the feature suite (i) client viewing data collection, (ii) audience measurement, and/or (iii) advertisement replacement.

V. Example Variations

Although the examples and features described above have been described in connection with specific entities and specific operations, in practice, there are likely to be many instances of these entities and many instances of these operations being performed, perhaps contemporaneously or simultaneously, on a large-scale basis. Indeed, in practice, the content-modification system 100 is likely to include many content-distribution systems (each potentially transmitting content on many channels) and many content-presentation devices, with some or all of the described operations being performed on a routine and repeating basis in connection with some or all of these entities.

In addition, although some of the operations described in this disclosure have been described as being performed by a particular entity, the operations can be performed by any entity, such as the other entities described in this disclosure. Further, although the operations have been recited in a particular order and/or in connection with example temporal language, the operations need not be performed in the order recited and need not be performed in accordance with any particular temporal restrictions. However, in some instances, it can be desired to perform one or more of the operations in the order recited, in another order, and/or in a manner where at least some of the operations are performed contemporaneously/simultaneously. Likewise, in some instances, it can be desired to perform one or more of the operations in accordance with one more or the recited temporal restrictions or with other timing restrictions. Further, each of the described operations can be performed responsive to performance of one or more of the other described operations. Also, not all of the operations need to be performed to achieve one or more of the benefits provided by the disclosure, and therefore not all of the operations are required.

Although certain variations have been described in connection with one or more examples of this disclosure, these variations can also be applied to some or all of the other examples of this disclosure as well and therefore aspects of this disclosure can be combined and/or arranged in many ways. The examples described in this disclosure were selected at least in part because they help explain the practical application of the various described features.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
   at a consent management server, receiving from a remotely-located client device a consent-processing request comprising a pointer to a network-based resource associated with a one or more consent packages specific and unique to the client device, each of the one or more consent packages comprising identifiers of consent features of services available to the client device, each consent feature of which requires prior end-user consent in order to be activated for the client device;
   responsive to the consent-processing request, using the pointer to establish a secure interactive communication session with the client device configured for user selection of one or more consent options associated with at least one of the one or more consent packages;
   at the consent management server, receiving from the client device, via the secure interactive communication session, user consent data input including a respective consent choice for each of the one or more consent options, each respective consent choice indicating one of either acceptance or rejection of consent to activating for the client device an associated consent feature identified with the at least one of the one or more consent packages; and
   at the consent management server, storing the respective consent choices of the received consent data in a database associated with the consent management server,
   wherein information corresponding to the respective consent choices stored in the database is also recorded in a device-based device record that is stored on the client device, and that comprises a device-based activation whitelist for recording an identifier of each consent feature associated with a respective consent choice indicating acceptance of consent.

2. The method of claim 1, wherein the pointer is specific and unique to the client device, and comprises a uniform record locator (URL) for a web resource associated with the one or more consent packages, and wherein using the pointer to establish the secure interactive communication session with the client device comprises: retrieving from a web server associated with the consent management server webpage content specific to the client device using the URL; and establishing a secure web-based communication session.

3. The method of claim 1, wherein the database comprises a flat database storing a respective server-based device record associated with each of one or more respective client devices, including the client device, each respective server-based device record being indexed by a key that is unique to the associated respective client device, wherein each consent feature identified with the at least one of the one or more consent packages is identified by way of a respective consent agreement, and wherein storing the respective consent choices of the received consent data in the database comprises: in the server-based device record associated with the client device, setting a status of each respective consent agreement to either accepted or rejected according to the respective consent choice associated with the consent feature identified by the respective consent agreement; synchronizing the server-based activation whitelist in the server-based device record associated with the client device with the device-based activation whitelist in the device-based device record on the client device; and synchronizing a server-based sequence number in the server-based device record associated with the client device with a device-based sequence number in the device-based device record on the client device.

4. The method of claim 3, wherein synchronizing the server-based activation whitelist in the server-based device record associated with the client device with the device-based activation whitelist in the device-based device record on the client comprises recording in both the server-based device record and the device-based device record the identifier of each consent feature associated with a respective consent choice indicating acceptance of consent, and wherein synchronizing the server-based sequence number in the server-based device record associated with the client device with the device-based sequence number in the device-based device record on the client comprises recording the same value for both the server-based sequence number and the device-based sequence number.

5. The method of claim 4, wherein a prior version of the server-based device record is stored in the flat database prior to receiving the consent-processing request, and wherein synchronizing the server-based activation whitelist in the server-based device record associated with the client device with the device-based activation whitelist in the device-based device record on the client further comprises deleting from the prior server-based activation whitelist the identifier of any consent feature corresponding to a consent feature associated with a respective consent choice indicating rejection of consent.

6. The method of claim 3, further comprising, prior to receiving the consent-processing request: receiving from the client device a check-in request comprising a device token previously cryptographically-signed by the consent management server, a global identifier (GID) that is a unique key associated with the client device, and a prior version of the device-based device record; retrieving a prior version of the server-based device record associated with the client device using the GID as an index key into the flat database; making a determination that the server-based activation whitelist in the prior version of the server-based device record associated with the client device is out of synchronization with the activation whitelist in the prior version of the device-based device record in the token; and in response to the determination, transmitting a consent request notification to the client device, the consent request notification being an indicator for causing the client device to transmit the consent-processing request.

7. The method of claim 3, further comprising, prior to receiving the consent-processing request: receiving from the client device a check-in request comprising a device token previously cryptographically-signed by the consent management server, a global identifier (GID) that is a unique key associated with the client device, and a prior version of the device-based device record; retrieving a prior version of the server-based device record associated with the client device using the GID as an index key into the flat database; making a determination that the server-based sequence number in the server-based device record associated with the client device has the same value as the device-based sequence number in the device-based device record on the content-presentation device, wherein the determination indicates that the server-based activation whitelist in the server-based device record associated with the client device is synchronized with the device-based activation whitelist in the device-based device record on the client device, and wherein the consent-processing request comprises an unsolicited request from the client device for initiation of an interactive process for review of previous consent choices.

8. The method of claim 3, wherein each respective consent agreement is associated with a human-readable description of the respective agreement, and wherein using the pointer to establish a secure interactive communication session with the client device comprises: determining a language associated with the client device; and providing to the client device, within the interactive communication session, the human-readable description in the language.

9. The method of claim 1, wherein the identifier of each given consent feature associated with a respective consent choice identifies at least one of (i) one or more device functions of the given consent feature that are configured for carrying out device-side operations of the given consent feature, or (ii) one or more cloud functions of the given consent feature that are configured for carrying out cloud-side operations of the given consent feature.

10. The method of claim 1; wherein the client device is a user device for presentation reception and presentation of at least one of video media content or audio media content, and wherein the consent features comprise a feature suite, the feature suite being at least one of (i) client viewing data collection, (ii) audience measurement; or (iii) advertisement replacement.

11. A consent management platform disposed in a computing cloud and comprising:
   one or more processors; and
   a computer-readable storage medium having stored thereon program instructions that, upon execution by the one or processors, cause the consent management platform to carry out operations including:
   receiving from a remotely-located content-presentation device a consent-processing request comprising an identifier string specific and unique to the content-presentation device;
   responsive to the consent processing request, using the identifier string to establish a secure interactive communication session with the content-presentation device configured for user selection of one or more consent options associated with a particular consent package of the consent management platform, the particular consent package comprising identifiers of consent features of a media distribution system that require prior end-user consent in order to be activated for the content-presentation device, wherein the particular consent package is one of one or more consent packages for which the content-presentation device has been designated as a target device by the consent management platform;

receiving from the content-presentation device, via the secure interactive communication session, user consent data input including a respective consent choice for each of the one or more consent options, each respective consent choice indicating one of either acceptance or rejection of consent to activating for the content-presentation device an associated consent feature identified with the particular consent package; and storing the respective consent choices of the received consent data in a database of the consent management platform, wherein information corresponding to the respective consent choices stored in the database of the consent management platform is recorded in a device-based device record that is stored on the content-presentation device, and that comprises a device-based activation whitelist for recording an identifier of each consent feature associated with a respective consent choice indicating acceptance of consent.

12. The consent management platform of claim 11, wherein the identifier string specific and unique to the content-presentation device comprises a uniform record locator (URL) for a web resource associated with the one or more consent packages, and wherein using the identifier string to establish the secure interactive communication session with the content-presentation device comprises: retrieving from a web server of the consent management platform webpage content specific to the content-presentation device using the URL; and establishing a secure web-based communication session.

13. The consent management platform of claim 11, wherein the database of the consent management platform comprises a flat database storing a respective server-based device record associated with each of one or more respective content-presentation devices, including the content-presentation device, each respective server-based device record being indexed by a key that is unique to the associated respective content-presentation device, wherein each consent feature identified with the particular consent package is identified by way of a respective consent agreement, and wherein storing the respective consent choices of the received consent data in the database of the consent management platform comprises: in the server-based device record associated with the content-presentation device, setting a status of each respective consent agreement to either accepted or rejected according to the respective consent choice associated with the consent feature identified by the respective consent agreement; synchronizing the server-based activation whitelist in the server-based device record associated with the content-presentation device with the device-based activation whitelist in the device-based device record on the content-presentation device; and synchronizing the server-based sequence number in the server-based device record associated with the content-presentation device with a device-based sequence number in the device-based device record on the content-presentation device.

14. The consent management platform of claim 13, wherein synchronizing the server-based activation whitelist in the server-based device record associated with the content-presentation device with the device-based activation whitelist in the device-based device record on the content-presentation comprises recording in both the server-based device record and the device-based device record the identifier of each consent feature associated with a respective consent choice indicating acceptance of consent, and wherein synchronizing the server-based sequence number in the server-based device record associated with the content-presentation device with the device-based sequence number in the device-based device record on the content-presentation comprises recording the same value for both the server-based sequence number and the device-based sequence number.

15. The method of claim 14, wherein a prior version of the server-based device record is stored in the flat database prior to receiving the consent processing request, and wherein synchronizing the server-based activation whitelist in the server-based device record associated with the content-presentation device with the device-based activation whitelist in the device-based device record on the content-presentation further comprises deleting from the prior server-based activation whitelist the identifier of any consent feature corresponding to a consent feature associated with a respective consent choice indicating rejection of consent.

16. The consent management platform of claim 13, wherein the operations further include, prior to receiving the consent processing request: receiving from the content-presentation device a check-in request comprising a device token previously cryptographically-signed by the server, a global identifier (GID) that is the unique key associate with the content-presentation device, and a prior version of the device-based device record; retrieving a prior version of the server-based device record associated with the content-presentation device using the GID as an index key into the flat database; making a determination that the server-based activation whitelist in the prior version of the server-based device record associated with the content-presentation device is out of synchronization with the activation whitelist in the prior version of the device-based device record in the token; and in response to the determination, transmitting a consent request notification to the content-presentation device, the consent request notification being an indicator for causing the content-presentation device to transmit the consent processing request.

17. The consent management platform of claim 13, wherein the operations further include, prior to receiving the consent processing request: receiving from the content-presentation device a check-in request comprising a device token previously cryptographically-signed by the server, a global identifier (GID) that is the unique key associate with the content-presentation device, and a prior version of the device-based device record; retrieving a prior version of the server-based device record associated with the content-presentation device using the GID as an index key into the flat database; making a determination that the server-based sequence number in the server-based device record associated with the content-presentation device has the same value as the device-based sequence number in the device-based device record on the content-presentation device, wherein the determination indicates that the server-based activation whitelist in the server-based device record associated with the content-presentation device is synchronized with the device-based activation whitelist in the device-based device record on the content-presentation device, and wherein the consent-processing request comprises an unsolicited request from the content-presentation device for initiation of an interactive process for review of previous consent choices.

18. The consent management platform of claim 13, wherein each respective consent agreement is associated with a human-readable description of the respective agreement, and wherein using the identifier string to establish a secure interactive communication session with the content-presentation device comprises: determining a language associated with the content-presentation device; and providing to the content-presentation device, within the interactive communication session, the human-readable description in the language.

19. The consent management platform of claim 11, wherein the identifier of each given consent feature associated with a respective consent choice identifies at least one of (i) one or more device functions of the given consent feature that are configured for carrying out device-side operations of the given consent feature, or (ii) one or more cloud functions of the given consent feature that are configured for carrying out cloud-side operations of the given consent feature, and wherein the content-presentation device is a user device for presentation reception and presentation of at least one of video media content or audio media content, and wherein the consent features comprise a feature suite, the feature suite being at least one of (i) client viewing data collection, (ii) audience measurement, or (iii) advertisement replacement.

20. A non-transitory computer-readable storage medium having stored thereon program instructions that, upon execution by one or more processors of a consent management platform, cause the consent management platform to carry out operations including: receiving from a remotely-located content-presentation device a consent-processing request comprising an identifier string specific and unique to the content-presentation device; responsive to the consent processing request, using the identifier string to establish a secure interactive communication session with the content-presentation device configured for user selection of one or more consent options associated with a particular consent package of the consent management platform, the particular consent package comprising identifiers of consent features of a media distribution system that require prior end-user consent in order to be activated for the content-presentation device, wherein the particular consent package is one of one or more consent packages for which the content-presentation device has been designated as a target device by the consent management platform; receiving from the content-presentation device, via the secure interactive communication session, user consent data input including a respective consent choice for each of the one or more consent options, each respective consent choice indicating one of either acceptance or rejection of consent to activating for the content-presentation device an associated consent feature identified with the particular consent package; and storing the respective consent choices of the received consent data in a database of the consent management platform, wherein information corresponding to the respective consent choices stored in the database of the consent management platform is recorded in a device-based device record that is stored on the content-presentation device, and that comprises a device-based activation whitelist for recording an identifier of each consent feature associated with a respective consent choice indicating acceptance of consent.

\* \* \* \* \*